US012096714B2

(12) United States Patent
 Chaplin

(10) Patent No.: US 12,096,714 B2
(45) Date of Patent: Sep. 24, 2024

(54) SEED SOWING APPARATUS

(71) Applicant: Simon Robert Frank Chaplin, Great Abington (GB)

(72) Inventor: Simon Robert Frank Chaplin, Great Abington (GB)

( * ) Notice: Subject to any disclaimer, the term of this patent is extended or adjusted under 35 U.S.C. 154(b) by 928 days.

(21) Appl. No.: 17/259,855

(22) PCT Filed: Jun. 28, 2019

(86) PCT No.: PCT/GB2019/051847
 § 371 (c)(1),
 (2) Date: Jan. 12, 2021

(87) PCT Pub. No.: WO2020/012155
 PCT Pub. Date: Jan. 16, 2020

(65) Prior Publication Data
 US 2021/0219485 A1 Jul. 22, 2021

(30) Foreign Application Priority Data

Jul. 13, 2018 (GB) .................................... 1811551
Sep. 26, 2018 (GB) .................................... 1815693
Oct. 22, 2018 (GB) .................................... 1817183

(51) Int. Cl.
 *A01C 5/06* (2006.01)
(52) U.S. Cl.
 CPC .............. *A01C 5/062* (2013.01); *A01C 5/066* (2013.01)
(58) Field of Classification Search
 CPC ........... A01C 5/062; A01C 5/066; A01C 5/06; A01C 5/00
 See application file for complete search history.

(56) References Cited

U.S. PATENT DOCUMENTS

| 2,364,958 A | 12/1944 | Drennan |
| 3,362,361 A | 1/1968 | Morrison, Jr. |
| 4,417,530 A | 11/1983 | Kopecky |
| 4,721,047 A | 1/1988 | Stauch |
| 4,798,151 A | 1/1989 | Rodrigues, Jr. |
| 7,669,537 B1 | 3/2010 | Hall et al. |

FOREIGN PATENT DOCUMENTS

| CN | 203219703 | 10/2013 |
| CN | 103797937 A | 8/2016 |
| EP | 0183203 B1 | 3/1989 |
| GB | 2560801 | 9/2018 |
| WO | 2014/183182 A1 | 11/2014 |

OTHER PUBLICATIONS

International Search Report for International Application No. PCT/GB2019/051847 dated Dec. 12, 2019, 7 pages.
International Written Opinion for International Application No. PCT/GB2019/051847 dated Dec. 12, 2019, 11 pages.
Search Report for United Kingdom Search Report for GB1909323.6 dated Dec. 19, 2019, 4 pages.
Further Search Report for GB1909323.6 dated Jul. 30, 2020, 1 page.

*Primary Examiner* — Christopher J. Novosad
(74) *Attorney, Agent, or Firm* — TraskBritt

(57) ABSTRACT

A seeding unit comprising: a support; a soil opening member mounted to the support; and a seed delivery outlet, defining an exit aperture for releasing seed; wherein the soil opening member comprises: an upper blade portion operative to form a seed collection slot in the ground; and a lower blade portion laterally offset from the upper blade portion and operative to form a deep rooting slot in the ground that is offset laterally from the seed collection slot.

49 Claims, 22 Drawing Sheets

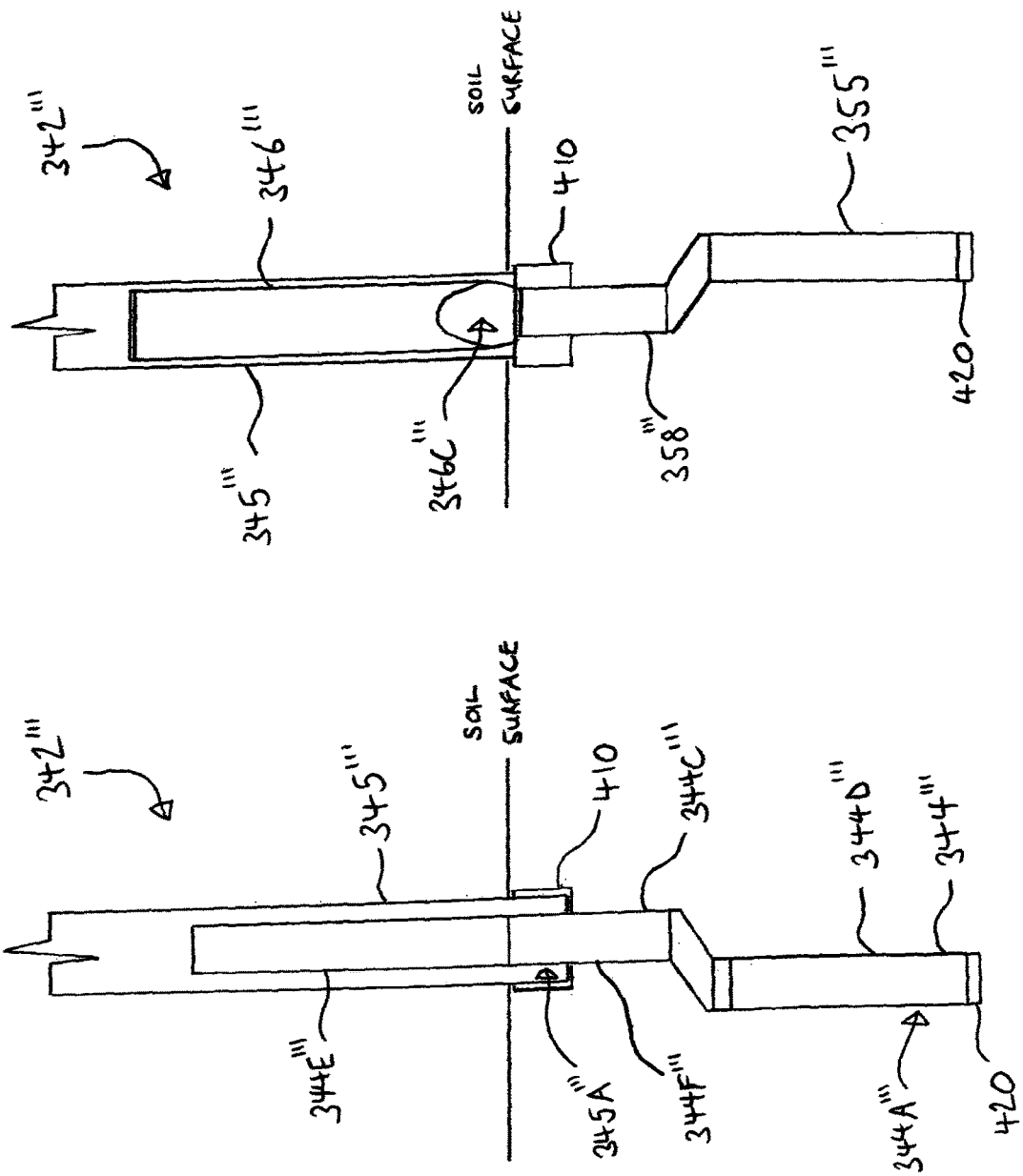

SEED SOWING APPARATUS

CROSS-REFERENCE TO RELATED APPLICATIONS

This application is a national phase entry under 35 U.S.C. § 371 of International Patent Application PCT/GB2019/051847, filed Jun. 28, 2019, designating the United States of America and published as International Patent Publication WO 2020/012155 A1 on Jan. 16, 2020, which claims the benefit under Article 8 of the Patent Cooperation Treaty to Great Britain Patent Application Serial No. 1811551.9, filed Jul. 13, 2018, Great Britain Patent Application Serial No. 1815693.5, filed Sep. 26, 2018, and Great Britain Patent Application Serial No. 1817183.5, filed Oct. 22, 2018.

TECHNICAL FIELD

The present disclosure relates to seed sowing apparatus.

BACKGROUND

A variety of types of seed sowing (or "seed drill") devices are known in the art. Typically such devices comprise a tractor-towable frame supporting a leading soil opening/seed depositing stage followed by a trailing soil closing stage.

The soil opening stage may take various forms but typically comprises a plurality of laterally spaced soil opening members each associated with a seed delivery outlet connected to a seed source (typically a metered seed supply). In one well known arrangement, the soil opening stage comprises rows of drilling tines each operative to form a trench for receiving seeds via the seed delivery outlet.

Typically the soil closing stage comprises a roller or wheel for compacting soil parted by the soil opening stage.

One problem with known seed drill devices is that seed drilling may only be performed when soil conditions are suitable. If the soil is too wet, the roller or wheel of the soil closing stage will quickly become clogged preventing optimal operation. This problem is particularly acute in the case of heavy (e.g., high clay content) soils.

Another problem is ensuring that seed is planted at an optimal depth in the ground to encourage germination while enabling good root formation.

The present inventor has identified the need for an improved seed sowing device that overcomes or at least alleviates problems associated with the prior art.

BRIEF SUMMARY

In accordance with a first aspect of the present disclosure, a seeding unit is provided comprising: a support (e.g., frame mounting part for attaching the seeding unit to a towable frame); a soil opening member mounted to the support; and a seed delivery outlet, defining an exit aperture for releasing seed; wherein the soil opening member comprises: an upper part (e.g., upper upright part) operative to form a seed collection slot in the ground; and a lower part (e.g., lower upright part) laterally offset from the upper part and operative to form a deep rooting slot in the ground that is offset laterally from the seed collection slot.

In this way, a seeding unit is provided with a soil opening member that forms a trench with a relatively shallow depth region for collecting seed and an adjacent deeper slot for receiving root growth.

In one embodiment, the lower part is substantially laterally offset from the upper part (e.g., substantially fully laterally offset from the upper part).

In one embodiment, the upper part of the soil opening member is substantially laterally aligned with the exit aperture of the seed delivery outlet.

In one embodiment, the lower part is substantially longitudinally aligned with the upper part.

In one embodiment, the soil opening member comprises a blade supported by a soil engaging tine (e.g., leg tine).

In one embodiment, the upper part is an upper blade part and the lower part is a lower blade part.

In one embodiment, the blade defines a leading forward facing soil engagement surface and the soil engaging tine defines a trailing forward facing soil engagement surface.

In one embodiment, the trailing forward-facing soil engagement surface of the soil engaging tine extends substantially perpendicular to the forward direction.

In one embodiment, the blade is positioned wholly or substantially in advance of the soil engaging tine (e.g., mounted to a front face of the soil engaging tine).

In one embodiment, the soil engaging tine has a width (e.g., an effective width) in the direction of travel greater than a width (e.g., an effective width) of the blade.

In one embodiment, the upper blade part projects downwardly beyond (e.g., substantially beyond) a lower edge of the soil engaging tine (e.g., to form a leading trench). In this way, the blade will penetrate deeper into the soil to form a relatively deep but typically narrow trench.

In one embodiment, the upper blade part comprises a substantially upright upper blade part.

In one embodiment, the lower blade part comprises a substantially upright lower blade part.

In one embodiment, the lower blade part is connected to the upper blade part by a laterally extending blade portion.

In one embodiment, one or more of the upper blade part, the lower blade part and the laterally extending blade portion define a bevelled leading edge (e.g., double-bevelled leading edge).

In one embodiment, the laterally extending blade portion is inclined relative to vertical.

In one embodiment, the apparatus further comprises a seed deflector configured to deflect seed exiting the seed delivery outlet towards the seed collection slot formed by the upper part of the soil opening member. In this way, the seed deflector acts to reduce the likelihood of seed falling into the deep rooting slot formed by the lower part of the soil opening member.

In one embodiment, the seed deflector defines a longitudinally extending deflection surface.

In one embodiment, the longitudinally extending deflection surface extends substantially along a full longitudinal length of the seed delivery outlet (e.g., full length in the direction of travel).

In one embodiment, the elongate longitudinally extending deflection surface is inclined (e.g., to direct seed bound for the deep rooting slot towards the seed collection slot).

In one embodiment, the seed deflector is mounted to the support or to the soil engaging tine.

In one embodiment, the upper blade part defines an upper soil engaging surface and the lower blade part defines a lower soil engaging surface.

In one embodiment, the upper soil engaging surface is longitudinally recessed relative to the lower soil engaging surface.

In one embodiment, the lower soil engaging surface is longitudinally recessed relative to the upper soil engaging surface.

In one embodiment, upper and lower portions of the soil engaging surface are longitudinally recessed relative to a central portion of the soil engaging surface (e.g., to form a delta-profile).

In one embodiment, upper and lower portions of the upper soil engaging surface are longitudinally recessed relative to a central portion of the upper soil engaging surface (e.g., with the upper soil engaging surface having a delta-profile).

In one embodiment, an upper portion of the lower soil engaging surface is recessed relative to a lower (e.g., lowermost) portion of the lower soil engaging surface.

In one embodiment, the seed delivery outlet comprises an upper body section for connection to a seed delivery hose and a lower body section defines the exit aperture.

In one embodiment, the seed delivery outlet is mounted to the soil engaging tine.

In one embodiment, the lower body section has a restricted width in the direction of travel relative to the upper body section.

In one embodiment, the lower body section is substantially concealed from view by the soil engaging tine when viewed from the front.

In one embodiment, the upper body section is substantially tubular.

In one embodiment, the lower body section has a width in the direction of travel that is smaller than a width of the upper body section (e.g., tapered end).

In one embodiment, the lower body section has a (e.g., tapered) flattened tubular form (e.g., formed by compressing an end portion of a length of tubing).

In one embodiment, the exit aperture is inclined (e.g., relative to horizontal) such that a leading part of the exit aperture is lower than a trailing part of the exit aperture.

In one embodiment, the exit aperture is inclined by 40-70° (e.g., substantially 60°).

In one embodiment, the soil opening member is mountable to the support in one of a plurality of different height positions relative to the support (e.g., by means of a vertically extending series of apertures provided in the soil engaging tine).

In one embodiment, the seed collection slot and the deep rooting slot together form a slot and the seeding unit further comprises an elongate longitudinally extending slot engagement member operative to travel inside the slot beneath the seed delivery outlet and to cover an entrance to the deep rooting slot.

In this way, a seeding unit is provided with a soil opening member that forms a trench with a relatively shallow depth region for collecting seed and an adjacent deeper slot for receiving root growth, whereby the slot engagement member prevents seed from dropping into to the deep rooting slot. Typically the slot engagement member will act to collect seed released from the seed delivery outlet. The movement of the slot engagement member through the soil will act to mix the collected seed with the soil to prevent the collected seed dropping into the deep rooting slot once the slot engagement member has advanced beyond the location of the seed.

In a first group of embodiments, the slot engagement member is operative to travel inside the seed collection slot. For example, the slot engagement member is sized to (e.g., snugly) fit inside the seed collection slot but too large to fit into the deep seeding slot.

In another embodiment, the slot engagement member is operative to travel inside the deep rooting slot (e.g., with an upper edge of the slot engagement member operative to mix collected seed with the soil).

In one embodiment, the slot engagement member has a leading end coupled to the seeding unit (e.g., connected to the soil opening member).

In one embodiment, the slot engagement member has a trailing end that is free to follow the path of the leading end.

In one embodiment, the trailing end is configured to drop into the seed collection slot and travel along the entrance to the deep rooting slot.

In one embodiment, the slot engagement member is movable relative to the soil opening member (e.g., articulated).

In one embodiment, the slot engagement member is a compliant member (e.g., flexible non-rigid member).

In one embodiment, the compliant member is selected from the group of: a chain; a cable; and a rope.

In a second group of embodiments, the slot engagement member is operative to travel inside the deep rooting slot.

In one embodiment, the slot engagement member defines an upper edge operative to collect falling seed.

In one embodiment, the upper edge is configured to mix collected seed with the soil.

In one embodiment, the upper edge of the slot engagement member is positioned beneath the seed delivery outlet.

In one embodiment, the upper edge of the slot engagement member is substantially level with or is above an entrance to the deep rooting slot (e.g., is substantially level with or is above the level of an underside of the upper part of the soil opening member).

In one embodiment, the slot engagement member comprises an (e.g., upright) elongate plate extending longitudinally from a position in advance of the seed delivery outlet to a position trailing the seed delivery outlet, the elongate plate being configured to travel inside the deep rooting slot behind the lower part of the soil opening member.

In one embodiment, the elongate plate extends longitudinally from the lower part of the soil opening member. In one embodiment, the elongate plate is integrally formed with the lower part of the soil opening member (e.g., so as to form a single blade part).

In one embodiment, the elongate plate is positioned relative to the support such that the elongate plate is wholly or substantially below the soil surface when the seeding unit is in use.

In one embodiment, the elongate plate has a lateral width substantially similar to the lateral width of the lower part of the soil opening member (e.g., is sized and aligned to (e.g., snugly) fit inside the deep seeding slot).

In one embodiment, the upper edge of the slot engagement member comprises a bevelled edge.

In one embodiment, the upper edge of the slot engagement member includes a raised rear projection (e.g., immediately trailing the bevelled edge) operative to divert seed towards side walls of the seed collection slot.

In one embodiment, the upper edge of the slot engagement member further comprises a soil disrupter (e.g., laterally projecting wing or laterally extending soil sweeper bar) operative to disrupt side walls of the seed collection slot.

In one embodiment, the upper part of the soil opening member is operative to form a seed collection slot having a width that is greater than the width of the deep rooting slot formed by the lower part of the soil opening member.

In one embodiment, the slot engagement member extends substantially along a full longitudinal length of the seed delivery outlet (e.g., full length in the direction of travel) to a point rearward of the seed delivery outlet.

In one embodiment, the leading end of the slot engagement member is mounted in advance of the seed delivery outlet.

In one embodiment, the leading end of the slot engagement member is coupled to the support or to the soil engaging tine.

In embodiments in which the apparatus comprises a seed deflector, the slot engagement member (e.g., the leading end thereof) may be mounted to the seed deflector. In this way, the slot engagement member may be operative to collect seed that slips under the seed deflector.

In accordance with a second aspect of the present disclosure, a seed sowing apparatus comprises: a frame (e.g., towable frame) defining a leading part supporting a soil opening stage and a trailing part supporting a soil closing stage trailing (e.g., spaced rearwardly of) the soil opening stage, wherein the soil opening stage comprises a plurality of laterally spaced seeding units each as defined in accordance with the first aspect of the present disclosure (or any embodiment thereof), wherein each seeding unit is configured to form a respective seeded trench in the ground when the apparatus is in use driven through soil in a forward direction of travel; wherein the soil closing stage comprises a plurality of laterally spaced soil deflection members each associated with a respective one of the seeding units, each soil deflection member being spaced laterally (and longitudinally) from the soil opening member of its respective seeding unit and configured to deflect soil toward the seeded trench formed by the seeding unit.

In this way, the seed sowing apparatus (e.g., a seed drill) is provided that is capable of sowing seed in saturated heavy soil during periods when conventional seed drills utilizing a roller or wheel levelling device to perform soil closing of seeded trenches would be unsuitable for use.

In one embodiment, each soil deflection member is configured to form an unseeded trench (e.g., substantially unseeded) that is spaced laterally from the seeded trench formed by its respective seeding unit and deflect soil removed to form the unseeded trench toward the seeded trench. Each soil deflection member may be sufficiently laterally spaced to form the unseeded trench spaced from the seeded trench but sufficiently close that soil displaced during formation of the unseeded trench substantially covers the seeded trench. Typically each seeded trench is closed by a respective unseeded trench forming soil deflection member, but in the case of apparatus with multiple rows of seeding units, a seeded trench formed by the seeding unit of a leading row may be closed by a seeding unit of a trailing row (i.e., with only the seeded trenches formed by the trailing row of seeding units being closed by the unseeded trench forming soil deflection members).

In one embodiment, the seed sowing apparatus is configured to function without any soil levelling device (e.g., no roller or wheels in line with the soil opening members). In this way, the unseeded trenches formed by the trailing soil closing stage are left open.

In one embodiment, the seed sowing apparatus is rollerless.

In one embodiment, the seed sowing apparatus is wheelless (or at least there are no wheels in line with the soil opening members).

In one embodiment, the seed sowing apparatus is configured to be towed or pushed by a vehicle (e.g., by a tractor or the like). In one embodiment, the frame is configured to be attached to a tractor hitch (e.g., 3-point hitch).

In one embodiment, the plurality of seeding units are provided in at least first and second longitudinally-spaced rows (e.g., leading and trailing rows).

In one embodiment, each soil deflection member is associated with a pair of seeding units. In one embodiment, the soil deflection member is positioned laterally between the pair of seeding units.

In one embodiment, the seeding units of each pair are longitudinally spaced from one another (e.g., a leading seeding unit of the pair is located in the first row and a trailing seeding unit of the pair is located in the second row).

In one embodiment, each pair of seeding units is longitudinally offset relative to a neighboring pair.

In one embodiment, each soil deflection member is longitudinally offset relative to a neighboring soil deflection member.

In one embodiment, each soil opening member comprises a seed drilling tine.

In one embodiment, each soil deflection member comprises a trailing soil opening member. Since no seeds are delivered by the soil closing stage each trailing soil opening member will not be operative to receive seeds from the/any seed source.

In one embodiment, each trailing soil opening member comprises a seed drilling tine.

In one embodiment, each soil opening member is set to a first depth and the associated soil deflection member is set to a second depth (e.g., relative to a central axis of the frame). In one embodiment, the first depth is greater than the second depth (e.g., over 50% greater).

In one embodiment, the depth of each soil opening member and/or associated soil deflection member is adjustable (e.g., independently adjustable). For example, the depth of each member may be adjusted by lowering or raising the member relative to the frame.

In one embodiment, the frame orientation is adjustable relative to a device pulling/pushing the frame (e.g., tractor).

In one embodiment, the depth relative to the device is variable.

In one embodiment, the tilt (e.g., height of a leading part of the frame relative to trailing part of the frame) is adjustable.

In one embodiment, each soil deflection member (e.g., each trailing soil opening member) is associated with a pest control composition delivery device (e.g., slug pellet delivery device). In this way, unwanted pests may be lured into the open unseeded trenches and away from the adjacent closed seeded trenches.

In accordance with a third aspect of the present disclosure, there is provided a method of sowing seed, comprising: providing seed sowing apparatus comprising a plurality of seeding units as defined in the first aspect of the present disclosure (or any embodiment thereof); and forming a plurality of seeded trench sections in soil.

In accordance with a fourth aspect of the present disclosure, there is provided a method of sowing seed, comprising: providing seed sowing apparatus as defined in the second aspect of the present disclosure (or any embodiment thereof); using the seed sowing apparatus to: form a plurality of seeded trench sections in soil; and subsequently form adjacent each seeded trench section an unseeded soil displacement trench section, the unseeded soil displacement trench section being positioned relative to the seeded trench section such that soil displaced during formation of the unseeded soil displacement trench section covers (e.g., substantially covers) the adjacent seeded trench section.

In one embodiment, the step of subsequently forming the unseeded soil displacement trench sections comprises forming the unseeded soil displacement trench sections between adjacent pairs of seeded trench sections.

In one embodiment, the step of forming the plurality of seeded trench sections is performed by a leading part of a seed sowing device, and the step of subsequently forming the unseeded soil displacement trench sections adjacent each seeded trench section is performed by a trailing part of the seed sowing device (e.g., with longitudinally spaced sections of seeded trench and unseeded soil displacement trench being formed simultaneously by the seed sowing device).

In one embodiment, the method further comprises depositing a pest control composition (e.g., slug pellets or the like) into the unseeded soil displacement trench. In one embodiment, the pest control composition is deposited by a pest control composition delivery device provided on the seed sowing device (e.g., with the depositing step occurring as the unseeded soil displacement trench is formed).

In one embodiment, the method includes leaving the unseeded soil displacement trench sections open to the environment (e.g., with no soil covering or soil levelling step subsequent to the step of forming the unseeded soil displacement trench sections).

In accordance with a fifth aspect of the present disclosure, a seeding unit comprises: a support (e.g., frame mounting part for attaching the seeding unit to a towable frame); a soil opening member mounted to the support, which forms a slot in the ground; and a seed delivery outlet, defining an exit aperture for releasing seed; wherein the soil opening member comprises: an upper part (e.g., upper upright part) that forms a seed collection slot in the ground; and a lower part (e.g., lower upright part) that forms a deep rooting slot in the ground (e.g., with the seed collection slot and the deep rooting slot together forming the aforementioned slot); wherein the seeding unit further comprises an elongate longitudinally extending slot engagement member operative to travel inside the slot beneath the seed delivery outlet and to cover an entrance to the deep rooting slot.

In this way, a seeding unit is provided with a soil opening member that forms a trench with a relatively shallow depth region for collecting seed and an adjacent deeper slot for receiving root growth, whereby the slot engagement member prevents seed from dropping into to the deep rooting slot. Typically the slot engagement member will act to collect seed released from the seed delivery outlet. The movement of the slot engagement member through the soil will act to mix the collected seed with the soil to prevent the collected seed dropping into the deep rooting slot once the slot engagement member has advanced beyond the location of the seed.

In a first group of embodiments, the slot engagement member is operative to travel inside the seed collection slot. For example, the slot engagement member is sized to (e.g., snugly) fit inside the seed collection slot but too large to fit into the deep seeding slot.

In one embodiment, the slot engagement member has a leading end coupled to the seeding unit (e.g., connected to the soil opening member).

In one embodiment, the slot engagement member has a trailing end that is free to follow the path of the leading end.

In one embodiment, the trailing end is configured to drop into the seed collection slot and travel along the entrance to the deep rooting slot.

In one embodiment, the slot engagement member is movable relative to the soil opening member (e.g., articulated).

In one embodiment, the slot engagement member is a compliant member (e.g., flexible non-rigid member).

In one embodiment, wherein the compliant member is selected from the group of: a chain; a cable; and a rope.

In a second group of embodiments, the slot engagement member is operative to travel inside the deep rooting slot.

In one embodiment, the slot engagement member defines an upper edge operative to collect falling seed.

In one embodiment, the upper edge is configured to mix collected seed with the soil.

In one embodiment, the upper edge of the slot engagement member is positioned beneath the seed delivery outlet.

In one embodiment, the upper edge of the slot engagement member is substantially level with or is above an entrance to the deep rooting slot (e.g., is substantially level with or is above the level of an underside of the upper part of the soil opening member).

In one embodiment, the slot engagement member comprises an (e.g., upright) elongate plate extending longitudinally from a position in advance of the seed delivery outlet to a position trailing the seed delivery outlet, the elongate plate being configured to travel inside the deep rooting slot behind the lower part of the soil opening member.

In one embodiment, the elongate plate extends longitudinally from the lower part of the soil opening member. In one embodiment, the elongate plate is integrally formed with the lower part of the soil opening member (e.g., so as to form a single blade part).

In one embodiment, the elongate plate is positioned relative to the support such that the elongate plate is wholly or substantially below the soil surface when the seeding unit is in use.

In one embodiment, the elongate plate has a lateral width substantially similar to the lateral width of the lower part of the soil opening member (e.g., is sized and aligned to (e.g., snugly) fit inside the deep seeding slot).

In one embodiment, the upper edge of the slot engagement member comprises a bevelled edge.

In one embodiment, the upper edge of the slot engagement member includes a raised rear projection (e.g., immediately trailing the bevelled edge) operative to divert seed towards side walls of the seed collection slot.

In one embodiment, the upper edge of the slot engagement member further comprises a soil disrupter (e.g., laterally projecting wing or laterally extending soil sweeper bar) operative to disrupt side walls of the seed collection slot.

For each of the first and second groups of embodiments, the following may apply:

In one embodiment, the upper part of the soil opening member is operative to form a seed collection slot having a width that is greater than the width of the deep rooting slot formed by the lower part of the soil opening member.

In one embodiment, the soil opening member comprises a blade supported by a soil engaging tine (e.g., leg tine).

In one embodiment, the upper part is formed by the soil engaging tine and the lower part is formed by the blade.

In one embodiment, the blade defines a leading forward facing soil engagement surface and the soil engaging tine defines a trailing forward facing soil engagement surface.

In one embodiment, the trailing forward-facing soil engagement surface of the soil engaging tine extends substantially perpendicular to the forward direction.

In one embodiment, the blade is positioned wholly or substantially in advance of the soil engaging tine (e.g., mounted to a front face of the soil engaging tine).

In one embodiment, the soil engaging tine has a width (e.g., an effective width) in the direction of travel greater than a width (e.g., an effective width) of the blade.

In one embodiment, the blade projects downwardly beyond (e.g., substantially beyond) a lower edge of the soil engaging tine (e.g., to form a leading trench). In this way, the blade will penetrate deeper into the soil to form a relatively deep but typically narrow trench.

In one embodiment, the slot engagement member extends substantially along a full longitudinal length of the seed delivery outlet (e.g., full length in the direction of travel) to a point rearward of the seed delivery outlet.

In one embodiment, the leading end of the slot engagement member is mounted in advance of the seed delivery outlet.

In one embodiment, the leading end of the slot engagement member is coupled to the support or to the soil engaging tine.

In one embodiment, the apparatus further comprises a seed deflector configured to deflect seed exiting the seed delivery outlet towards the seed collection slot (e.g., and away from the deep rooting slot).

In one embodiment, the slot engagement member (e.g., the leading end thereof) is mounted to the seed deflector. In this way, the slot engagement member may be operative to collect seed that slips under the seed deflector.

In one embodiment, the seed deflector defines a longitudinally extending deflection surface.

In one embodiment, the longitudinally extending deflection surface extends substantially along a full longitudinal length of the seed delivery outlet (e.g., full length in the direction of travel).

In one embodiment, the elongate longitudinally extending deflection surface is inclined (e.g., to direct seed bound for the deep rooting slot towards the seed collection slot).

In one embodiment, the seed deflector is mounted to the support or to the soil engaging tine.

In one embodiment, the blade comprises an upper blade part (e.g., above ground part) and a lower blade part (e.g., below ground part).

In one embodiment, the upper blade part is configured to direct trash upwards.

In one embodiment, the lower blade part defines an upper soil engaging surface and a lower soil engaging surface.

In one embodiment, the upper and lower soil engaging surfaces are inclined to form a recessed blade profile.

In one embodiment, the seed delivery outlet comprises an upper body section for connection to a seed delivery hose and a lower body section defines the exit aperture.

In one embodiment, the seed delivery outlet is mounted to the soil engaging tine.

In one embodiment, the lower body section has a restricted width in the direction of travel relative to the upper body section.

In one embodiment, the lower body section is substantially concealed from view by the soil engaging tine when viewed from the front.

In one embodiment, the upper body section is substantially tubular.

In one embodiment, the lower body section has a width in the direction of travel that is smaller than a width of the upper body section (e.g., tapered end).

In one embodiment, the lower body section has a (e.g., tapered) flattened tubular form (e.g., formed by compressing an end portion of a length of tubing).

In one embodiment, the exit aperture is inclined (e.g., relative to horizontal) such that a leading part of the exit aperture is lower than a trailing part of the exit aperture.

In one embodiment, the exit aperture is inclined by 40-70° (e.g., substantially 60°).

In one embodiment, the soil opening member is mountable to the support in one of a plurality of different height positions relative to the support (e.g., by means of a vertically extending series of apertures provided in the soil engaging tine).

In accordance with a sixth aspect of the present disclosure, there is provided seed sowing apparatus comprising: a frame (e.g., towable frame) defining a leading part supporting a soil opening stage and a trailing part supporting a soil closing stage trailing (e.g., spaced rearwardly of) the soil opening stage, wherein the soil opening stage comprises a plurality of laterally spaced seeding units each as defined in accordance with the fifth aspect of the present disclosure (or any embodiment thereof), wherein each seeding unit is configured to form a respective seeded trench in the ground when the apparatus is in use driven through soil in a forward direction of travel; wherein the soil closing stage comprises a plurality of laterally spaced soil deflection members each associated with a respective one of the seeding units, each soil deflection member being spaced laterally (and longitudinally) from the soil opening member of its respective seeding unit and configured to deflect soil toward the seeded trench formed by the seeding unit.

In this way, a seed sowing apparatus (e.g., a seed drill) is provided that is capable of sowing seed in saturated heavy soil during periods when conventional seed drills utilizing a roller or wheel levelling device to perform soil closing of seeded trenches would be unsuitable for use.

In one embodiment, each soil deflection member is configured to form an unseeded trench (e.g., substantially unseeded) that is spaced laterally from the seeded trench formed by its respective seeding unit and deflects soil removed to form the unseeded trench toward the seeded trench. Each soil deflection member may be sufficiently laterally spaced to form the unseeded trench spaced from the seeded trench but sufficiently close that soil displaced during formation of the unseeded trench substantially covers the seeded trench. Typically each seeded trench is closed by a respective unseeded trench forming soil deflection member, but in the case of apparatus with multiple rows of seeding units, a seeded trench formed by the seeding unit of a leading row may be closed by a seeding unit of a trailing row (i.e., with only the seeded trenches formed by the trailing row of seeding units being closed by the unseeded trench forming soil deflection members).

In one embodiment, the seed sowing apparatus is configured to function without any soil levelling device (e.g., no roller or wheels in line with the soil opening members). In this way, the unseeded trenches formed by the trailing soil closing stage are left open.

In one embodiment, the seed sowing apparatus is rollerless.

In one embodiment, the seed sowing apparatus is wheelless (or at least there are no wheels in line with the soil opening members).

In one embodiment, the seed sowing apparatus is configured to be towed or pushed by a vehicle (e.g., by a tractor or the like). In one embodiment, the frame is configured to be attached to a tractor hitch (e.g., 3-point hitch).

In one embodiment, the plurality of seeding units are provided in at least first and second longitudinally-spaced rows (e.g., leading and trailing rows).

In one embodiment, each soil deflection member is associated with a pair of seeding units. In one embodiment, the soil deflection member is positioned laterally between the pair of seeding units.

In one embodiment, the seeding units of each pair are longitudinally spaced from one another (e.g., a leading seeding unit of the pair is located in the first row and a trailing seeding unit of the pair is located in the second row).

In one embodiment, each pair of seeding units is longitudinally offset relative to a neighboring pair.

In one embodiment, each soil deflection member is longitudinally offset relative to a neighboring soil deflection member.

In one embodiment, each soil opening member comprises a seed drilling tine.

In one embodiment, each soil deflection member comprises a trailing soil opening member. Since no seeds are delivered by the soil closing stage each trailing soil opening member will not be operative to receive seeds from the/any seed source.

In one embodiment, each trailing soil opening member comprises a seed drilling tine.

In one embodiment, each soil opening member is set to a first depth and the associated soil deflection member is set to a second depth (e.g., relative to a central axis of the frame). In one embodiment, the first depth is greater than the second depth (e.g., over 50% greater).

In one embodiment, the depth of each soil opening member and/or associated soil deflection member is adjustable (e.g., independently adjustable). For example, the depth of each member may be adjusted by lowering or raising the member relative to the frame.

In one embodiment, the frame orientation is adjustable relative to a device pulling/pushing the frame (e.g., tractor).

In one embodiment, the depth relative to the device is variable.

In one embodiment, the tilt (e.g., height of a leading part of the frame relative to trailing part of the frame) is adjustable.

In one embodiment, each soil deflection member (e.g., each trailing soil opening member) is associated with a pest control composition delivery device (e.g., slug pellet delivery device). In this way, unwanted pests may be lured into the open unseeded trenches and away from the adjacent closed seeded trenches.

In accordance with a seventh aspect of the present disclosure, there is provided a method of sowing seed, comprising: providing seed sowing apparatus comprising a plurality of seeding units as defined in the fifth aspect of the present disclosure (or any embodiment thereof); and forming a plurality of seeded trench sections in soil.

In accordance with an eighth aspect of the present disclosure, a method of sowing seed is provided, comprising: providing seed sowing apparatus as defined in the sixth aspect of the present disclosure (or any embodiment thereof); using the seed sowing apparatus to: form a plurality of seeded trench sections in soil; and subsequently form adjacent each seeded trench section an unseeded soil displacement trench section, the unseeded soil displacement trench section being positioned relative to the seeded trench section such that soil displaced during formation of the unseeded soil displacement trench section covers (e.g., substantially covers) the adjacent seeded trench section.

In one embodiment, the step of subsequently forming the unseeded soil displacement trench sections comprises forming the unseeded soil displacement trench sections between adjacent pairs of seeded trench sections.

In one embodiment, the step of forming the plurality of seeded trench sections is performed by a leading part of a seed sowing device, and the step of subsequently forming the unseeded soil displacement trench sections adjacent each seeded trench section is performed by a trailing part of the seed sowing device (e.g., with longitudinally spaced sections of seeded trench and unseeded soil displacement trench being formed simultaneously by the seed sowing device).

In one embodiment, the method further comprises depositing a pest control composition (e.g., slug pellets or the like) into the unseeded soil displacement trench. In one embodiment, the pest control composition is deposited by a pest control composition delivery device provided on the seed sowing device (e.g., with the depositing step occurring as the unseeded soil displacement trench is formed).

In one embodiment, the method includes leaving the unseeded soil displacement trench sections open to the environment (e.g., with no soil covering or soil levelling step subsequent to the step of forming the unseeded soil displacement trench sections).

BRIEF DESCRIPTION OF THE DRAWINGS

Embodiments of the present disclosure will now be described by way of example with reference to the accompanying drawings in which:

FIG. 12B is a schematic front view of the seeding unit of FIG. 12A;

FIG. 12C is a schematic rear view of the seeding unit of FIG. 12A; and

DETAILED DESCRIPTION

Figure 1:
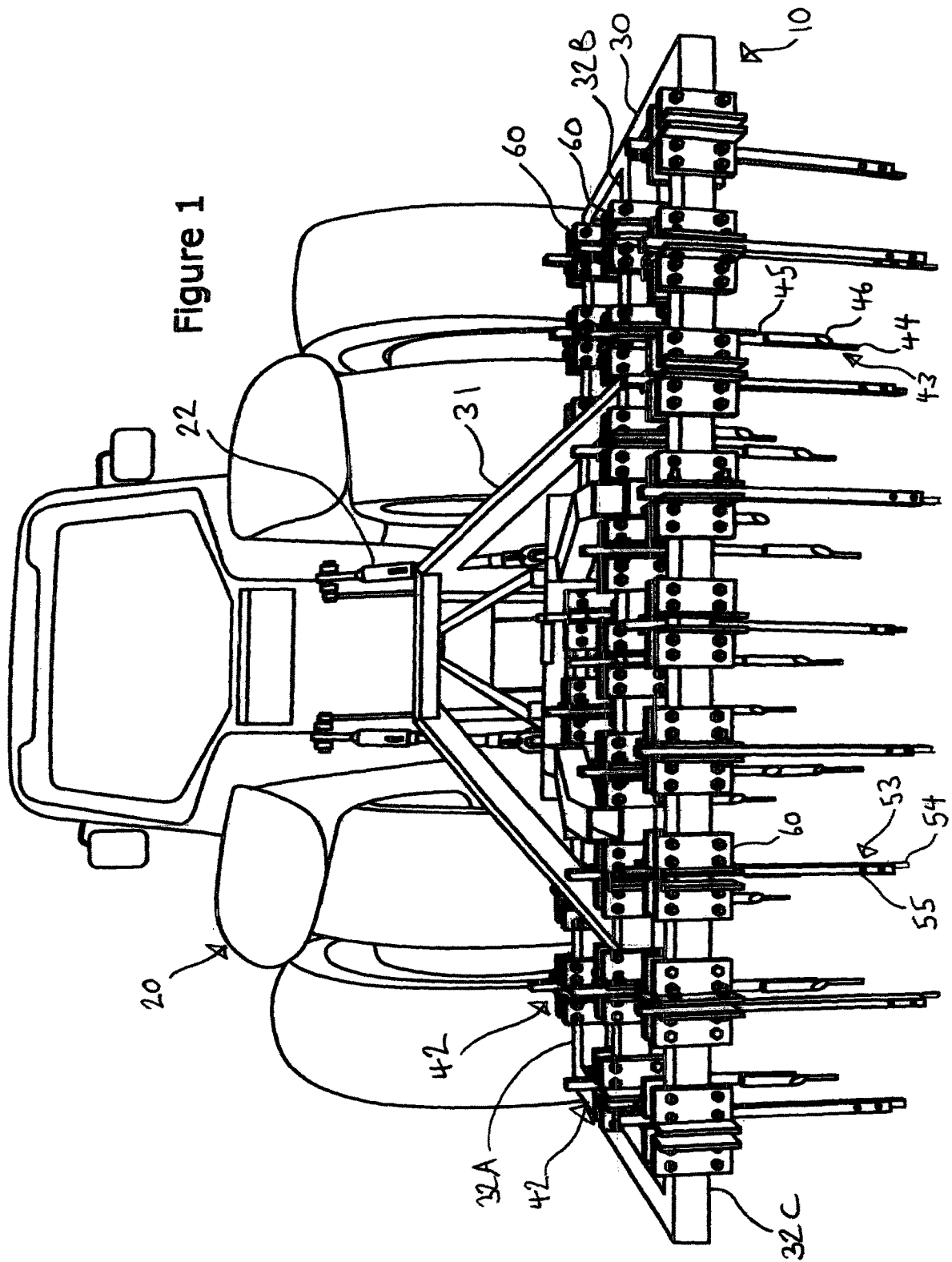
FIG. 1 is a schematic perspective rear view of a seed drill device in accordance with an embodiment of the present disclosure shown mounted to a rear of a tractor.
Figure 2:
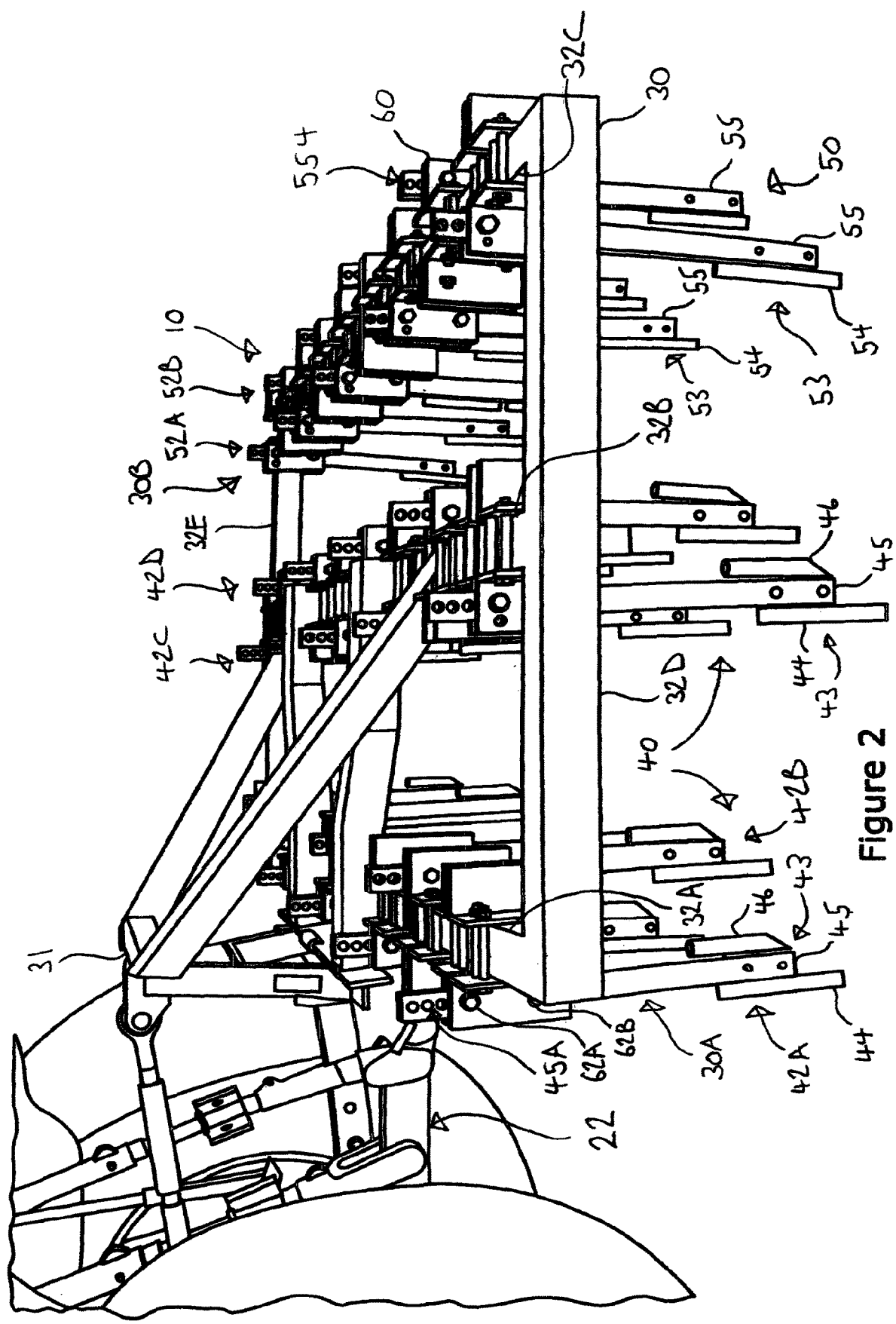
FIG. 2 is a schematic perspective side view of the seed drill device of FIG. 1.

FIGS. 1 and 2 show a seed drill device 10 for mounting to a tractor 20 equipped with a rear three-point linkage system 22.

Seed drill device 10 comprises a frame 30 defining a leading part 30A supporting a soil opening stage 40, a trailing part 30B supporting a soil closing stage 50 spaced rearwardly from the soil opening stage 40 and a tractor connector assembly 31. As illustrated most clearly in FIG. 3, frame 30 includes a laterally extending front bar 32A, a laterally extending center bar 32B and a laterally extending rear bar 32C, each connected at opposed lateral ends to longitudinally extending side bars 32D, 32E.

Figure 4:
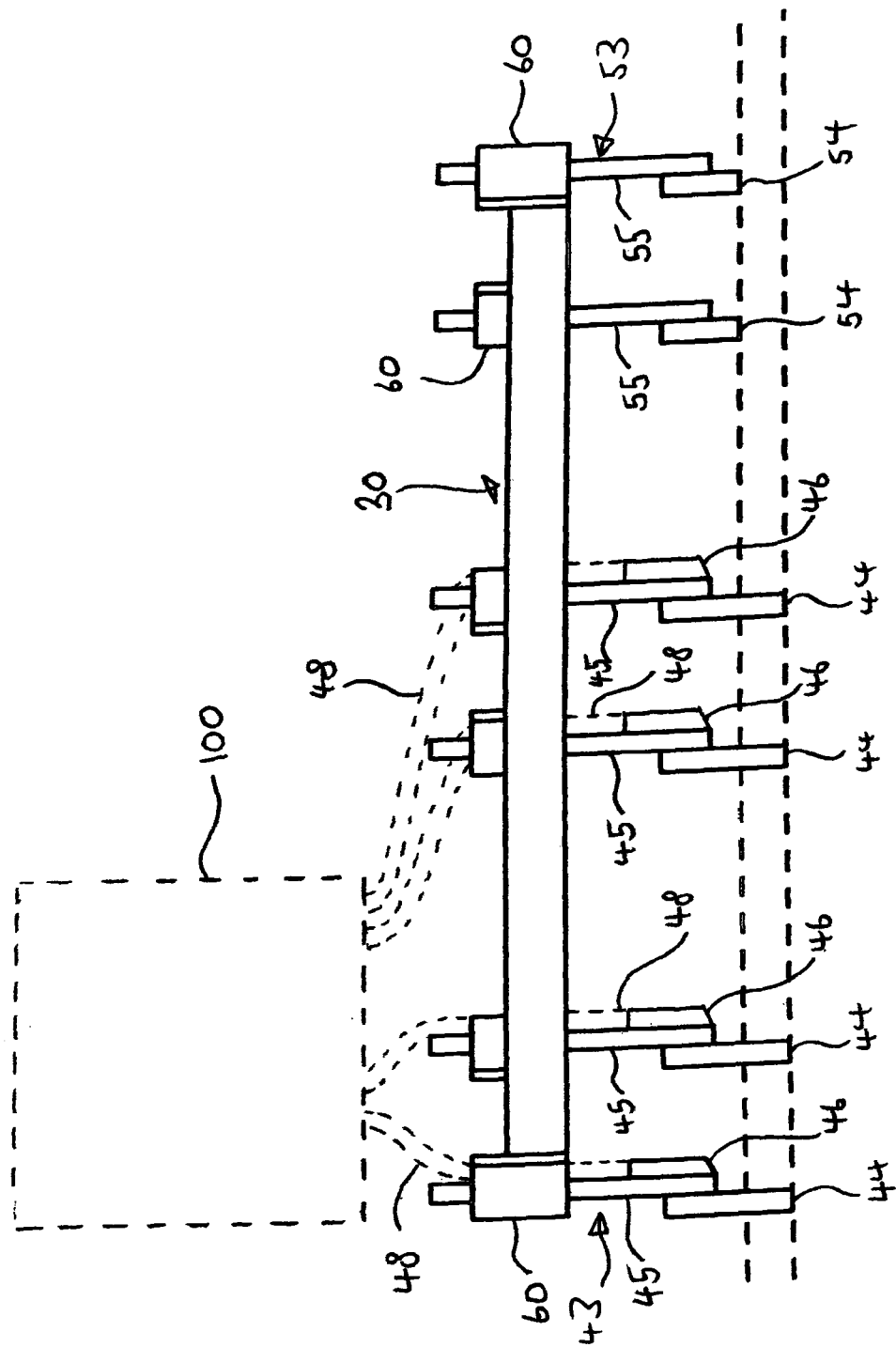
FIG. 4 is a schematic side view of the frame of seed drill device of FIG. 1.

Soil opening stage 40 comprises a plurality of rows 42A-42D of laterally spaced seeding units 42 each comprising a soil opening tine 43 comprising a soil opening blade 44 mounted on a blade support tine 45 and associated with a respective seed delivery outlet 46 (also mounted on blade support tine 45) and connected in a conventional manner via a flexible hose 48 to a metered seed source 100 (for simplicity shown in FIG. 4 only). As illustrated, rows 42A and 42B are respectively provided on the front and rear of front bar 32A of frame 30 while rows 42C and 42D are respectively provided on the front and rear of center bar 32B of frame 30.

Soil closing stage 50 comprises a plurality of rows 52A, 52B of laterally spaced trailing soil opening tines 53 (each comprising a soil opening blade 54 mounted on a blade support tine 55) each associated with a respective pair of seeding units 42. As illustrated, rows 52A and 52B are respectively provided on the front and rear of rear bar 32C.

This staggered arrangement of seeding units 42 and trailing soil opening tines 53 is configured to utilize space on the frame as efficiently as possible while minimizing unwanted interference between neighboring seeding units 42/neighboring soil opening tines 53.

Each of the soil opening blades 44, 54 are held in position by means of support brackets 60 bolted to frame 30, which in turn are connected to blade support tines 45, 55 via pairs of bolts 62A, 62B. Independent height adjustment of soil opening blades 44, 54 relative to frame 30 is achieved by relocating pairs of bolts 62A, 62B to a different pair of a series of apertures 45A, 55A formed in an upper section of blade support tines 45, 55.

Figure 3:
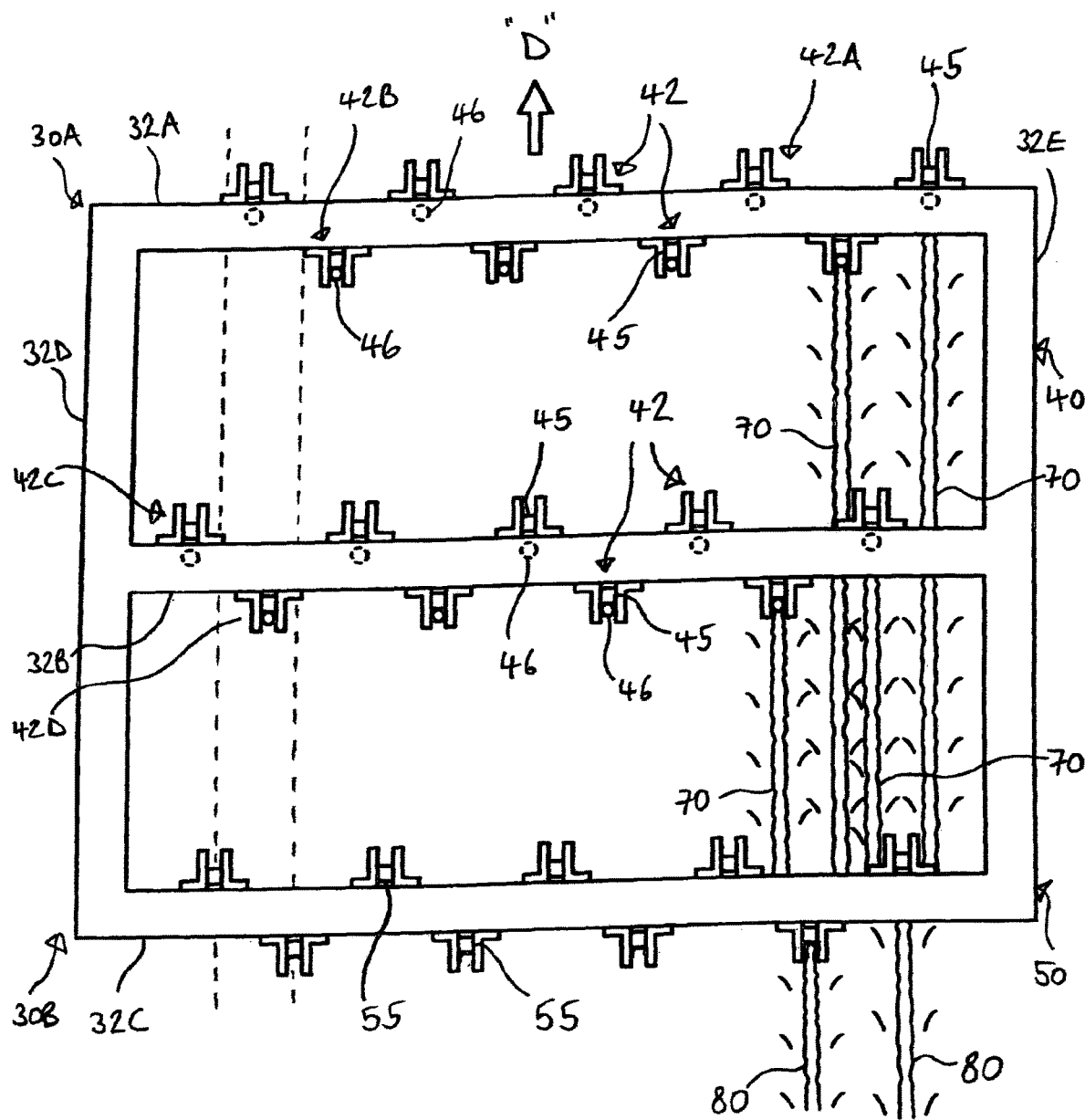
FIG. 3 is a schematic plan view of the frame of the seed drill device of FIG. 1 illustrating operation of the device in use.

As illustrated in FIG. 3, each soil opening tine 43 of the plurality of seeding units 42 is configured to form in combination with its associated seed delivery outlet 46 a respective seeded trench 70 in the ground when seed drill device 10 is driven through soil in a forward direction of travel "D." In contrast, each trailing soil opening tine 53 (which is not associated with a seed delivery outlet as it is part of the trailing soil closing stage 50) is configured to form an unseeded trench 80 between and laterally spaced from the seeded trenches 70 of each respective pair of seeding units 42. In accordance with the technique of the present disclosure, the spacing of the laterally spaced trenches 70, 80 is selected to be close enough to enable soil displaced during the formation of unseeded trenches 80 to be directed as part of the natural trench-forming action toward the neighboring seeded trench 70 whereby seeded trenches 70 are substantially covered by soil lifted and displaced laterally by trailing soil opening tines 53.

As illustrated in FIG. 4, the depth of soil opening blades 44 relative to trailing soil opening blades 54 may be set so that the trailing soil opening blades 54 are set to a shallower depth relative to their blade support tines 55 than soil opening blades 44. The precise relationship between the depth of soil opening blades 44 and 54 may depend upon soil conditions. Additional control including may be achieved by varying the position of blade support tines 45, 55 relative to frame 30 or by varying the orientation of frame 30 relative to tractor 20 by lowering, raising or pivoting frame 30 via rear three-point linkage system 22.

In the specific illustrated example, frame 30 is 3 m wide and there are eighteen soil opening tines 43 and nine trailing soil opening tines 53 (it is noted that these soil opening tines 53 may be referred to as "soil closing" tines by virtue of their operation to close seeded trenches 70). Blade support tines 45, 55 are 25 mm wide by 70 mm deep by 750 mm high. Each soil opening blade 44, 54 is formed by a 10 mm stainless steel cutting blade (e.g., tungsten FEROBIDE™ steel) welded on the front of the tine support. A length of blade around 100 mm long protrudes from blade support tines 45. In contrast, the length of blade protruding from blade support tines 55 is typically much smaller, approximately 30-60 mm in length (trailing soil opening blades 54 are mounted further up the leg with less overhang so that blade support tines 55 can be put deeper into the ground to achieve a greater deflection of soil toward the seeded trenches 70). Blade support tines 45, 55 are largely protected from soil abrasion as soil flows off soil opening blades 44, 54 and around blade support tines 45, 55. Blade support tines 45 are spaced (in a staggered four line formation using front and back mountings on the two front frame beams). Soil opening blades 44 are laterally spaced by a distance of around approximately 145 mm. Soil opening blades 54 sit substantially equidistant between each pair of soil opening blades 44, thus around 72.5 mm away. Typically this is close enough to flow the soil back onto the seeded trench 70 thereby closing the seeded trench securely around the deposited seed without unduly inverting the soil.

Optional depth control wheels (not shown) may be fitted at the rear of frame 30. In the case that the drill device includes depth control wheels, the device may be configured to allow the depth control wheels to be taken off to allow drilling in very sticky conditions. If large tractor-type tires are used to provide depth control (e.g., 2×1 m diameter rubber tractor tires) then almost no wet soil will stick to the flexing tire. Then the soil opening tines 43 of the drill can be altered for depth simply by lowering the draught depth by lowering or raising the three point linkage on the tractor. The depth of trailing soil opening tines 53 would be changed by a smaller degree since they are closer to the fulcrum provided by the large rear wheels. If additional depth adjustment is needed at the rear then the rear depth control tires can be deflated slightly or blade support tines 55 can be lowered using the bolt hole adjustments.

While it is conceivable that some form of soil levelling device may be included as part of the seed drill device 10 (e.g., for use in dry conditions or light soil), in the illustrated embodiment the seed drill device 10 is without any form of soil levelling device (e.g., it is a rollerless device with only soil opening tines 43, 53 and any optional depth control wheels spaced from the trenches making contact with the ground). Accordingly, a field processed by seed drill device 10 will be left with a series of open seedless trenches 80. Advantageously, these open seedless trenches 80 may in one embodiment be used to depositing a pest control composition (e.g., slug pellets or the like). Typically the pest control composition is deposited by a pest control composition delivery device provided on seed drill device 10 (e.g., with the depositing step occurring as the seedless soil displacement trench 80 is formed in a manner similar to the depositing of seeds into trenches 70). Furthermore, the seed drill device 10 may alleviate frost heave (when the ground surface freezes and it expands and rises up like an arch over the roots of the seedlings thus snapping the leaves off the rots, a common problem with fine seed beds) since advantageously the open seedless trenches may act as expansion joints.

While the seed drill device 10 of the present disclosure is intended for direct drilling in all soil types, the device will additionally drill in ploughed or cultivated soils. Advantageously the drill device of the present disclosure drills equally well or better in the worst drilling conditions because it uses the fluid movement of soil flow rather than disruption of the soil allowing the drill to work in heavy wet clay where no conventional drill can drill. Accordingly, whereas the limitations of conventional drills require drilling to be carried out early in the dry part of the season before weeds such as black grass have germinated (which is a major problem since currently the only way to kill resistant black grass is to germinate it on the field and then spray it with weed killer prior to drilling the actual crop), the seed drill of the present disclosure allows the farmer to leave the drilling until late in the autumn and confidently expect to drill all his crops after the previous crop weeds have been germinated and sprayed off but still within the optimal yield drilling date range.

In summary, the seed drill device 10 of the present disclosure may advantageously be suitable for drilling all seed sizes, at all depths, in all soil types and in all conditions.

FIGS. 5A-5D show an alternative seeding unit 142 in accordance with one embodiment of the present disclosure for use in seed drill device 10. Seeding unit 142 comprises a soil opening tine arrangement 143 including a soil opening blade 144 defining a leading forward facing bevelled soil engagement surface 144A mounted via bolts 143B to the front of a blade support tine 145, which in turn defines a trailing forward facing soil engagement surface 145A. An associated seed delivery outlet 146 is mounted on the rear of blade support tine 145 and an elongate longitudinally extending seed deflector bar 150 is mounted to an underside of blade support tine 145.

Figure 5A:
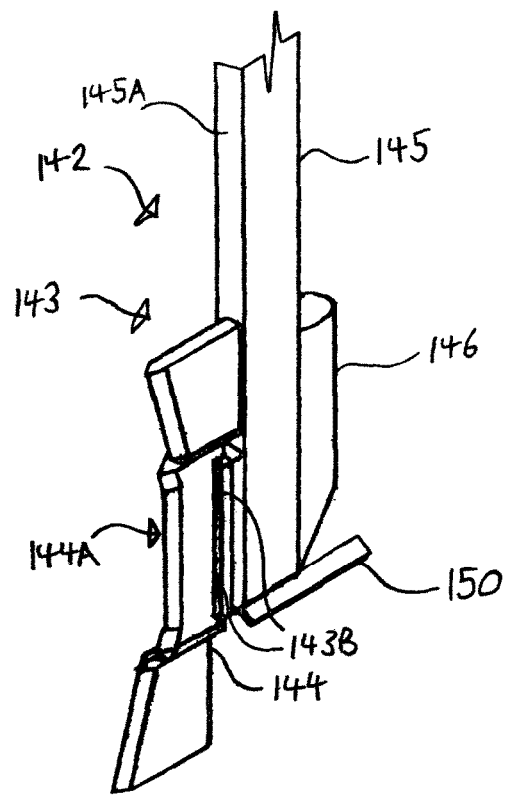
FIG. 5A is a schematic perspective front view of seeding unit for use in the seed drill device of FIG. 1.
Figure 5B:
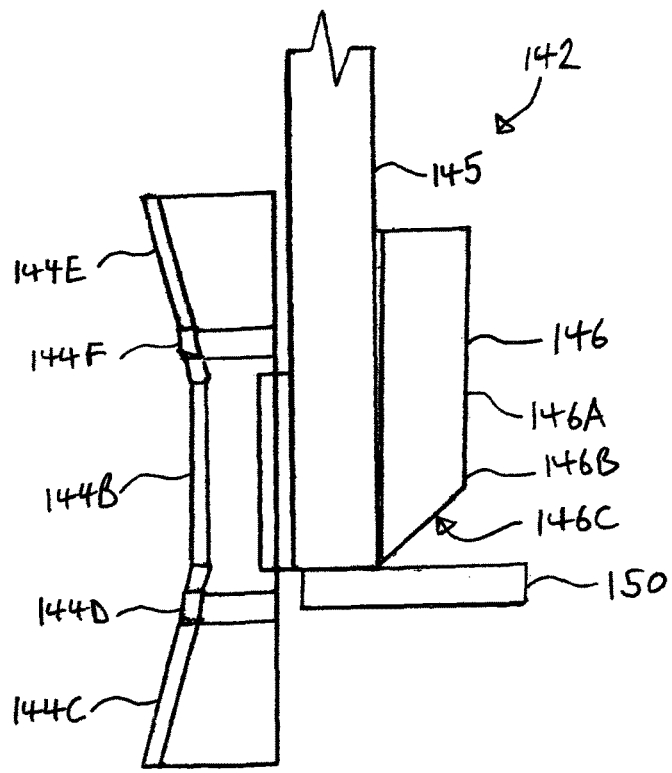
FIG. 5B is a schematic side view of the seeding unit of FIG. 5A.
Figure 5C:
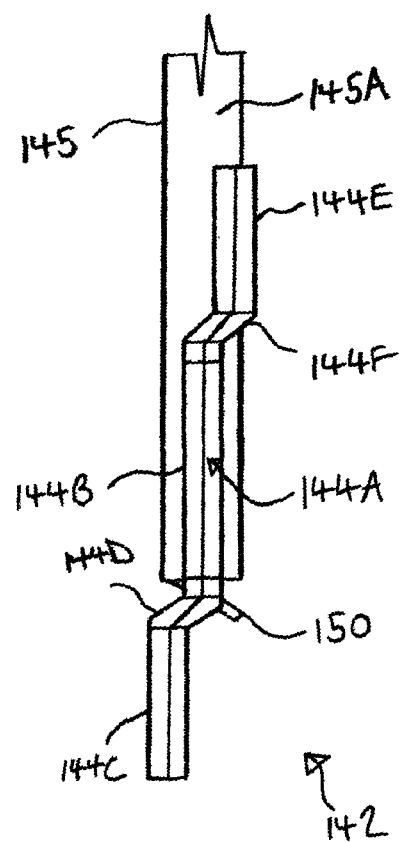
FIG. 5C is a schematic front view of the seeding unit of FIG. 5A.

Soil opening blade 144 comprises an upper blade portion 144B and a lower blade portion 144C depending from upper blade portion 144B. As shown in FIG. 5C, upper blade portion 144B is laterally aligned with blade support tine 145 and extends to a point below the underside of blade support tine 145. Lower blade portion 144C is laterally offset relative to the upper blade portion 144B by virtue of an inclined laterally extending blade portion 144D connecting the upper and lower blade portions 144B, 144C. Typically, soil opening blade 144 is formed by a 12 mm stainless steel cutting blade (e.g., tungsten FEROBIDE™ steel) and blade portions 144B, 144C and 144D are welded together.

Figure 5D:
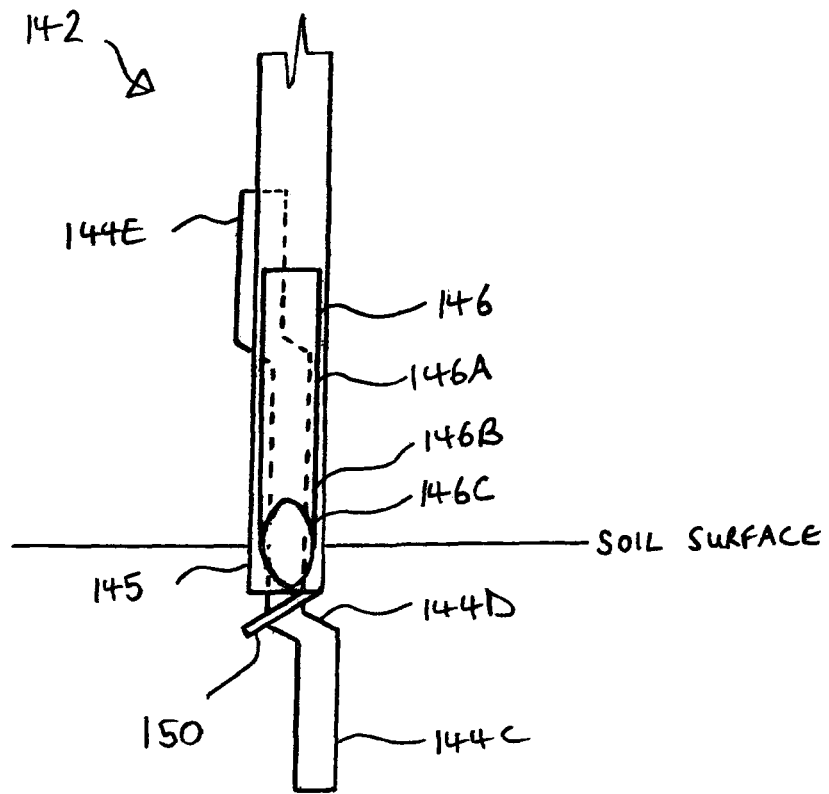
FIG. 5D is a schematic rear view of the seeding unit of FIG. 5A.
Figure 5E:
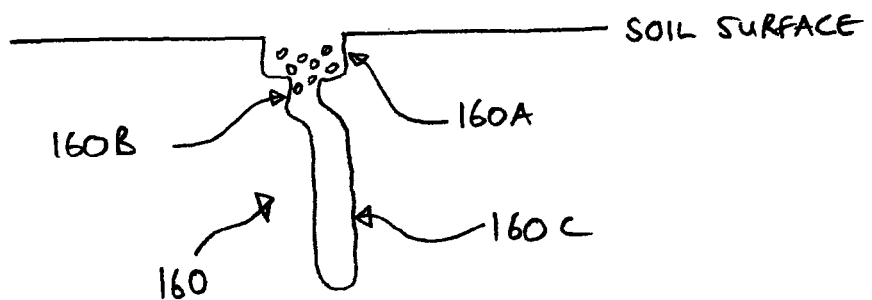
FIG. 5E is a schematic view of trenches formed by the seeding unit of FIG. 5A.

As shown, in FIG. 5E, seeding unit 142 is configured to form a seeded trench 160 comprising an upper trench portion 160A, an upper seed collection slot 160B and a deep rooting slot 160C substantially offset laterally from upper seed collection slot 160B. As most clearly illustrated in FIG. 5D, lower blade portion 144C is substantially fully offset laterally from the upper blade portion 144B such that the trench 160 formed by the two blade portions (as illustrated in FIG. 5E) are substantially offset laterally.

Seed delivery outlet 146 comprises an upper tubular body section 146A for connection to a seed delivery hose and a compressed lower body section 146B defining an inclined exit aperture 146C for releasing seed. Typically seed delivery outlet 146 has a width when viewed in the direction of travel that is less than a corresponding with of blade support tine 145 so that seed delivery outlet 146 is concealed from view when seeding unit 142 is viewed from the front. As illustrated in FIG. 5D, seed deflector bar 150 is positioned to receive the seed released from exit aperture 146C and inclined relative to vertical to deflect the released seed away from the deep root slot formed by lower blade portion 144C. Since a lower portion of the blade support tine 145 is below the soil surface, seed deflector bar 150 acts to direct seed into upper trench portion 160A/upper seed collection slot 160B of trench 160 where it can germinate away from deep rooting slot 160C, which may be too deep for optimal growth. In practice, the lateral action of the soil closing stage 50 will act to close the connection between slots 160B and 160C as the upper surface of soil is subjected to the closing action of the soil opening tines 53. However, deep rooting slot 160C will provide an accessible space for deep root development after germination.

Soil opening blade 144 is reversibly mountable on blade support tine 145 (via bolts 143B) such that a further blade portion 144E on an opposed side of upper blade portion 144B to the lower blade portion 144C (connected to upper blade portion 144B via an inclined laterally extending blade portion 144F) can become the lower blade portion, thereby extending the operational life of the soil opening blade 144. Lower blade portion 144C and further blade portion 144E are tapered such that the longitudinal depth of each portion increases with increased distance from upper blade portion 144B. In this way, leading forward facing soil engagement surface 144A of soil opening blade 144 has an inclined profile with a centrally recessed portion formed by upper blade portion 144B (e.g., concave blade profile).

Figure 6A:
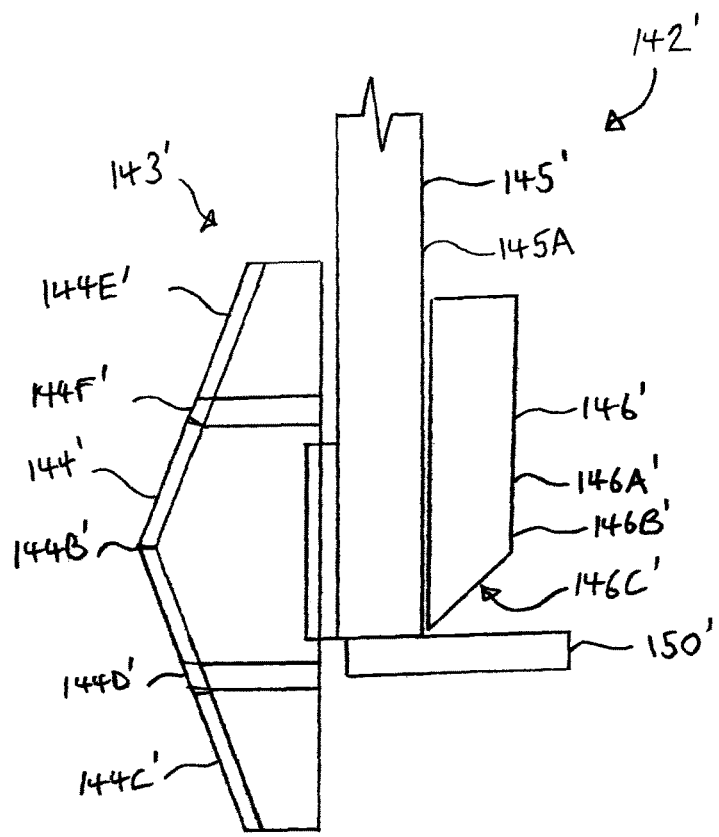
FIG. 6A is a schematic side view of an alternative seeding unit for use in the seed drill device of FIG. 1.
Figure 6B:
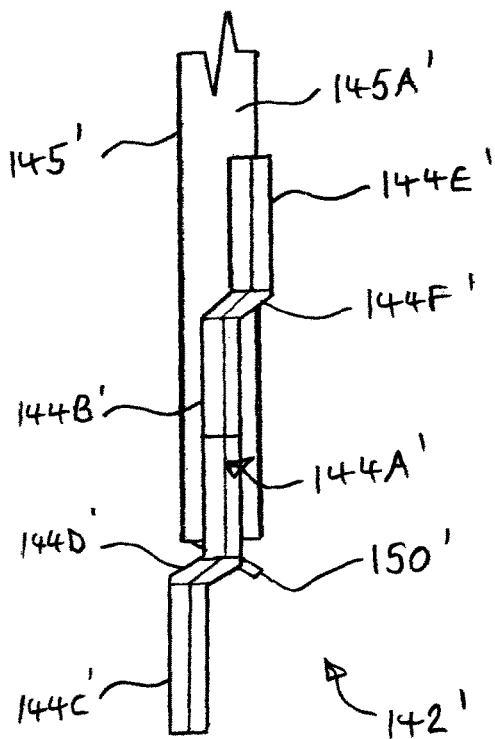
FIG. 6B is a schematic front view of the seeding unit of FIG. 6A.
Figure 6C:
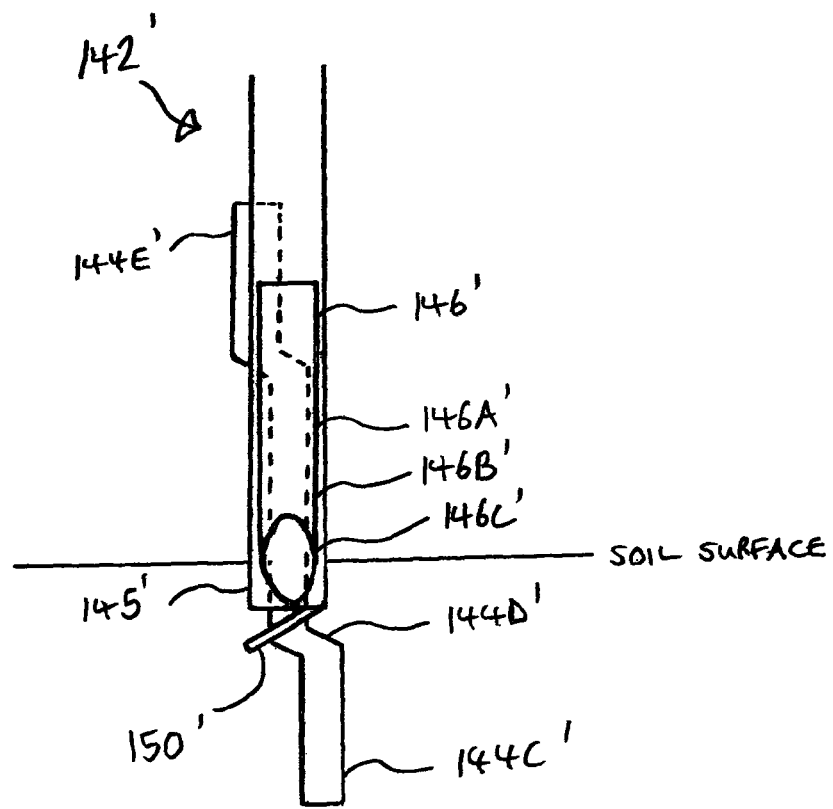
FIG. 6C is a schematic rear view of the seeding unit of FIG. 6A.

FIGS. 6A-6C show a second alternative seeding unit 142' for use in seed drill device 10 based on the seeding unit 142 (features in common are labelled accordingly). Seeding unit 142' differs from seeding unit 142 in that the leading forward facing soil engagement surface 144A' of soil opening blade 144' has an inclined profile with a central portion positioned longitudinally in advance of the upper and lower portions (e.g., to form a convex or delta blade profile). Like seeding unit 142, soil opening blade 144' is reversibly connected to blade support tine 145' via bolts (not shown).

In use, seeding unit 142' will produce a seeded trench similar to that depicted in FIG. 5E since the cross-sectional profile of the seeding unit 142' when viewed from the front is substantially identical to that of seeding unit 142. However, the delta blade profile may advantageously have the effect of sweeping weed seed lower into the seed bed where it cannot germinate whereby the act of subsequent drilling does not cause further weed emergence. Furthermore, the part of the blade above the apex of the delta will run above ground level and act to lift any surface trash up and around soil opening blade 144'.

Figure 7A:
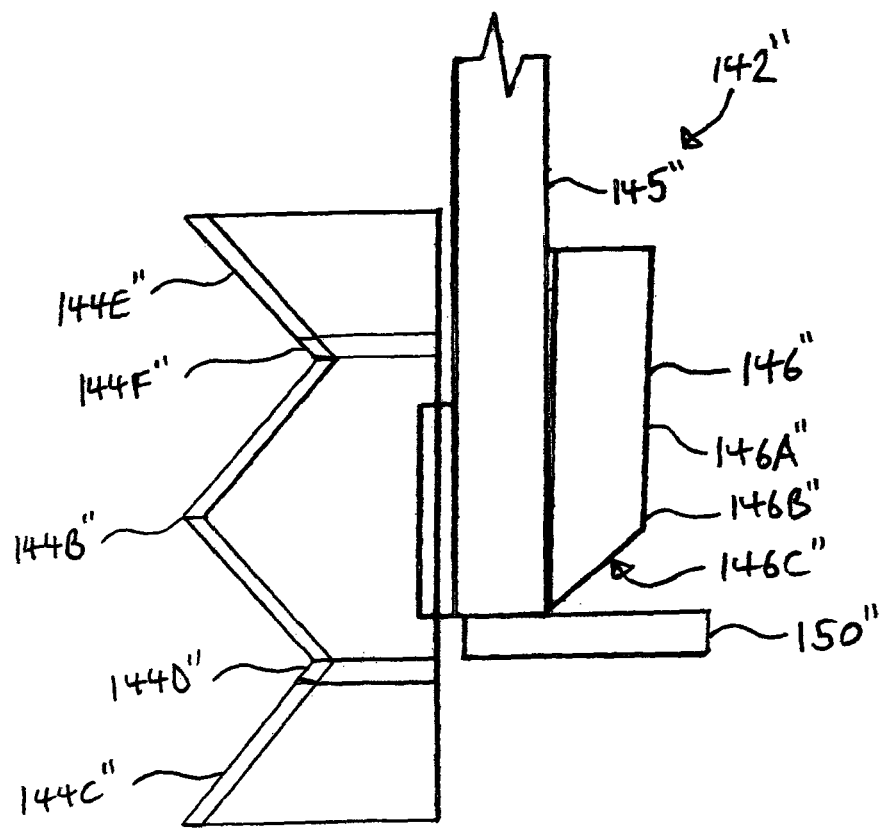
FIG. 7A is a schematic side view of a further alternative seeding unit for use in the seed drill device of FIG. 1.
Figure 7B:
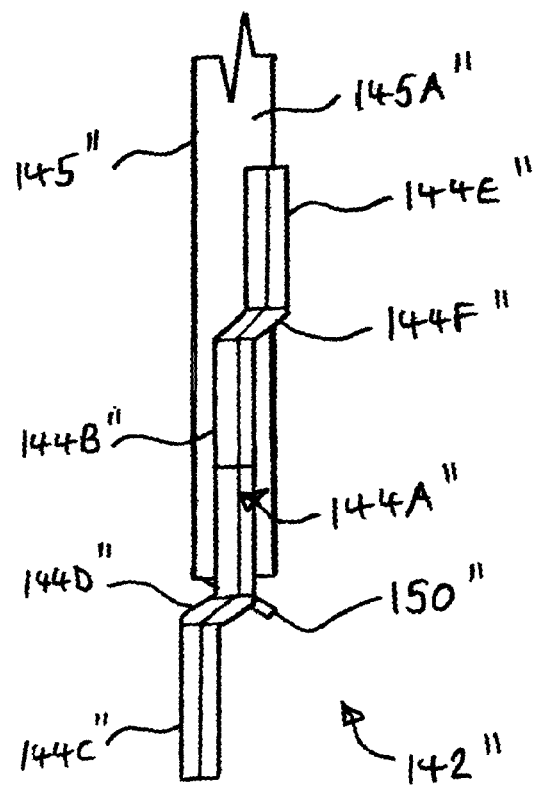
FIG. 7B is a schematic front view of the seeding unit of FIG. 7A.
Figure 7C:
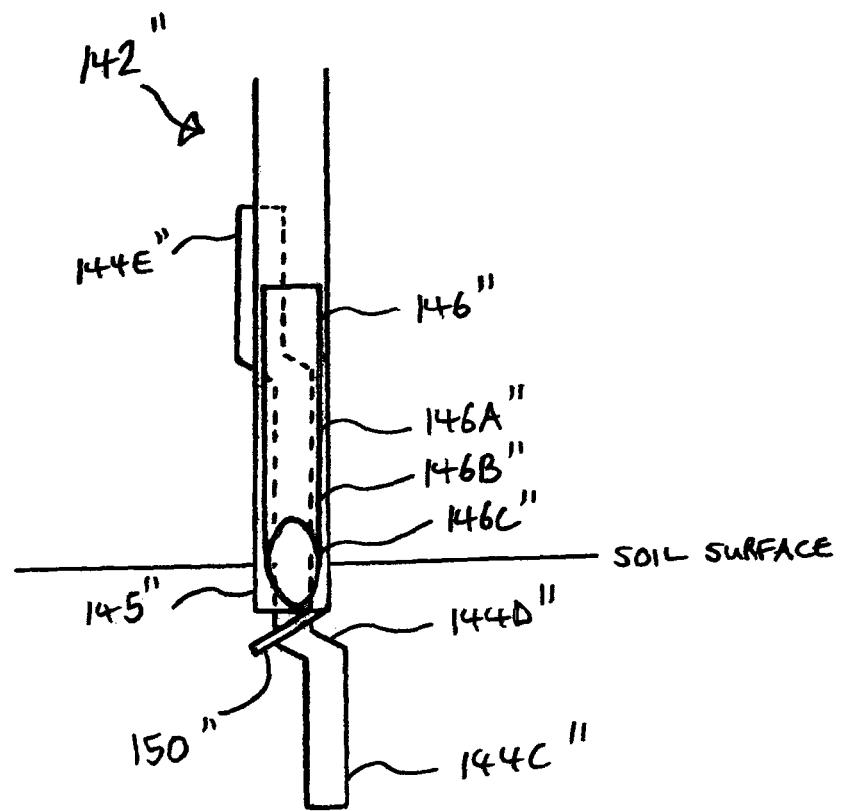
FIG. 7C is a schematic rear view of the seeding unit of FIG. 7A.

FIGS. 7A-7C show a third alternative seeding unit 142" for use in seed drill device 10 based on the seeding unit 142 (features in common are labelled accordingly). Seeding unit 142" differs from seeding unit 142 in that the upper blade portion 144B" of the leading forward facing soil engagement surface 144A" of soil opening blade 144" has a convex or delta blade profile. Like seeding unit 142, soil opening blade 144" is reversibly connected to blade support tine 145" via bolts (not shown).

Advantageously, the central delta blade profile may advantageously have the effect of sweeping weed seed lower into the seed bed where it cannot germinate. Furthermore, the deeper central section provides more metal to wear away and hence less maintenance. The forward pointed apex of the central delta blade will typically pull more easily through the soil than a flat central blade portion. As with the arrangement of FIGS. 6A-6C, the part of the blade above the apex of the delta will run above ground level and act to lift any surface trash up and around soil opening blade 144".

Figure 8A:
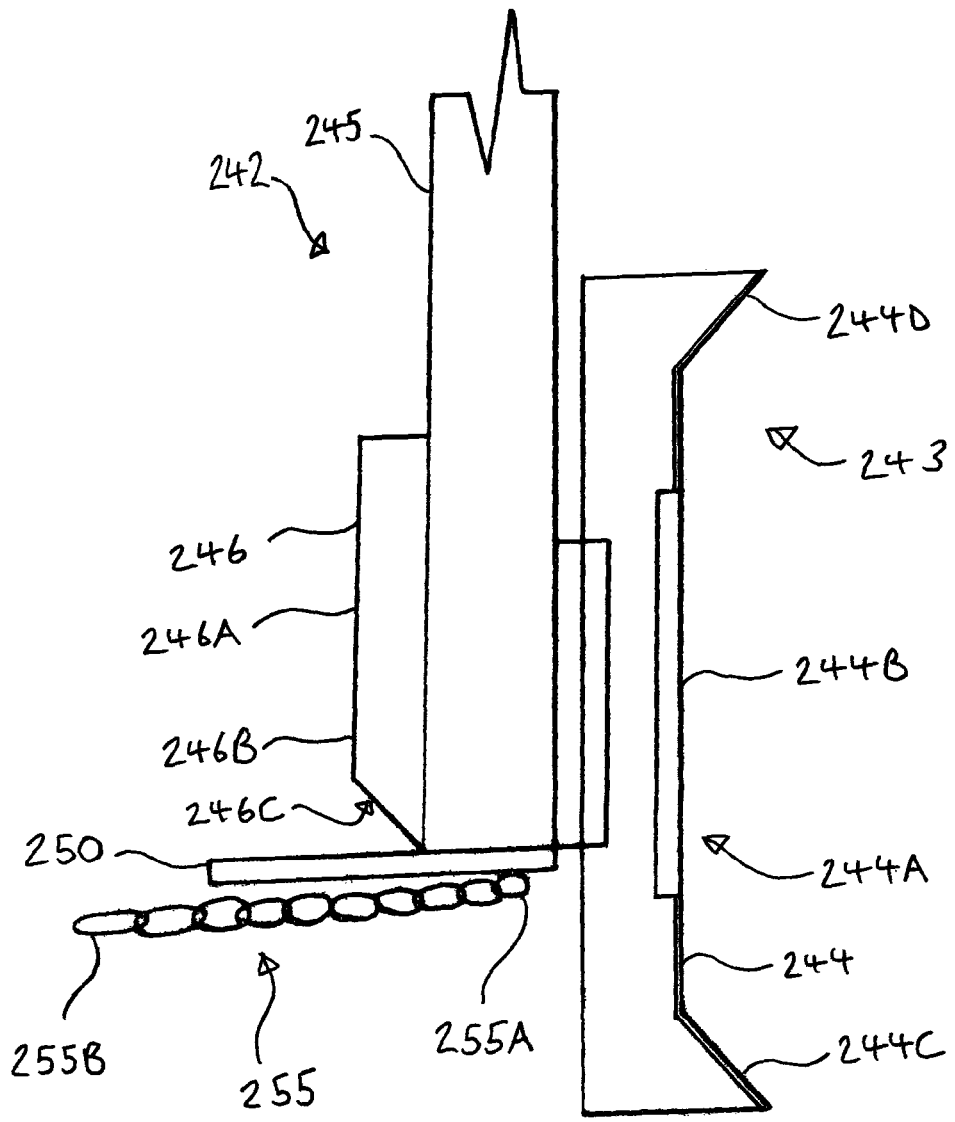
FIG. 8A is a schematic side view of a yet further alternative seeding unit for use in the seed drill device of FIG. 1.

FIG. 8A shows a yet further alternative seeding unit 242 in accordance with one embodiment of the present disclosure for use in seed drill device 10.

Seeding unit 242 comprises a soil opening tine arrangement 243 that includes a soil opening blade 244 defining a leading forward facing bevelled soil engagement surface 244A mounted via bolts (not shown) to the front of a blade support tine 245, which in turn defines a trailing forward facing soil engagement surface 245A. An associated seed delivery outlet 246 is mounted on the rear of blade support tine 245 and an elongate longitudinally extending seed deflector bar 250 is mounted to an underside of blade support tine 245.

Soil opening blade 244 comprises an upper blade portion 244B and a lower blade portion 244C depending from upper blade portion 244B. Upper blade portion 244B is laterally aligned with blade support tine 245 and extends to a point below the underside of blade support tine 245. Lower blade portion 244C may optionally be laterally offset relative to the upper blade portion 2424B as in the previous embodiments, but this lateral offset is not essential to this particular embodiment of the present disclosure and for simplicity a non-offset blade arrangement is illustrated. As before, soil opening blade 244 is typically formed by a 12 mm stainless steel cutting blade (e.g., tungsten FEROBIDE™ steel).

Figure 8B:
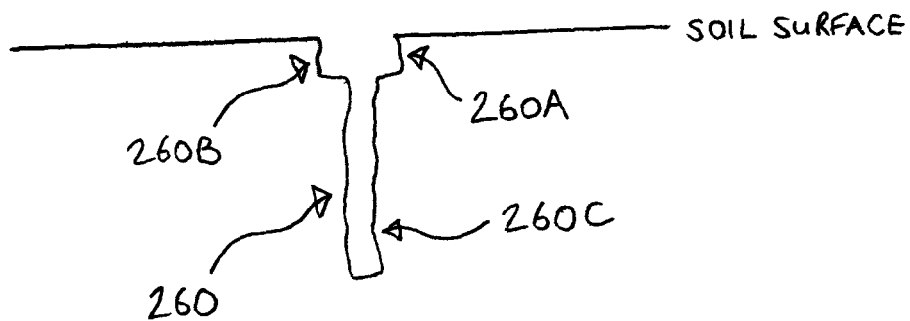
FIG. 8B is a schematic view of trenches formed by the seeding unit of FIG. 8A.

As shown, in FIG. 8B, seeding unit 242 is configured to form a seeded trench 260 comprising an upper trench portion 260A, an upper seed collection slot 260B and a lower and narrower central deep rooting slot 260C.

Seed delivery outlet 246 comprises an upper tubular body section 246A for connection to a seed delivery hose and a compressed lower body section 246B defining an inclined exit aperture 246C for releasing seed. Typically seed delivery outlet 246 has a width when viewed in the direction of travel that is less than a corresponding with of blade support tine 245 so that seed delivery outlet 246 is concealed from view when seeding unit 242 is viewed from the front. As illustrated, seed deflector bar 250 is positioned to receive the seed released from exit aperture 246C and inclined relative to vertical to deflect the released seed away from the deep root slot formed by lower blade portion 244C. Since a lower portion of the blade support tine 245 is below the soil surface, seed deflector bar 250 acts to direct seed into upper trench portion 260A/upper seed collection slot 260B of trench 260 where it can germinate and away from deep rooting slot 260C, which may be too deep for optimal growth.

An elongate compliant slot engagement member 255 (in this example, in the form of a compliant chain around 20 cm long) has a leading end 255A fixedly mounted to an underside of seed deflector bar 250 at a point in advance of exit aperture 246C and trailing end 255B located beyond the end of seed deflector bar 250 that is free to follow the path taken by leading end 255A. Slot engagement member 255 is sized to drop inside upper seed collection slot 260B and travel along inside the seed collection slot but is too wide to drop inside the narrower deep rooting slot 260C. In this way, slot engagement member 255 travels under seed deflector bar 250 to catch seed that slips under seed deflector bar to prevent seed falling into the deep rooting slot 260C. The action of slot engagement member 255 moving through the upper seed collection slot 260B causes the collected seed to be mixed with the soil at the seeding slot level so that the seed does not fall into the deep rooting slot 260C after the slot engaging member 255 has moved past the seed location.

Although a chain is illustrated, the compliant slot engagement member 255 may be formed by any suitable compliant member (e.g., a heavy cable or rope). Alternatively, the compliant slot engagement member 255 may be replaced by a solid bar positioned to travel in deep rooting slot 260C and having a mixing seed soil top edge.

As in the previous embodiments, soil opening blade 244 is reversibly mountable on blade support tine 245 such that a further blade portion 244D on an opposed side of upper blade portion 244B to the lower blade portion 244C can become the lower blade portion, thereby extending the operational life of the soil opening blade 244. Lower blade portion 244C and further blade portion 244D are tapered such that the longitudinal depth of each portion increases with increased distance from upper blade portion 244B. In this way, leading forward facing soil engagement surface 244A of soil opening blade 244 has an inclined profile with a centrally recessed portion formed by upper blade portion 244B (e.g., concave blade profile).

Figure 9A:
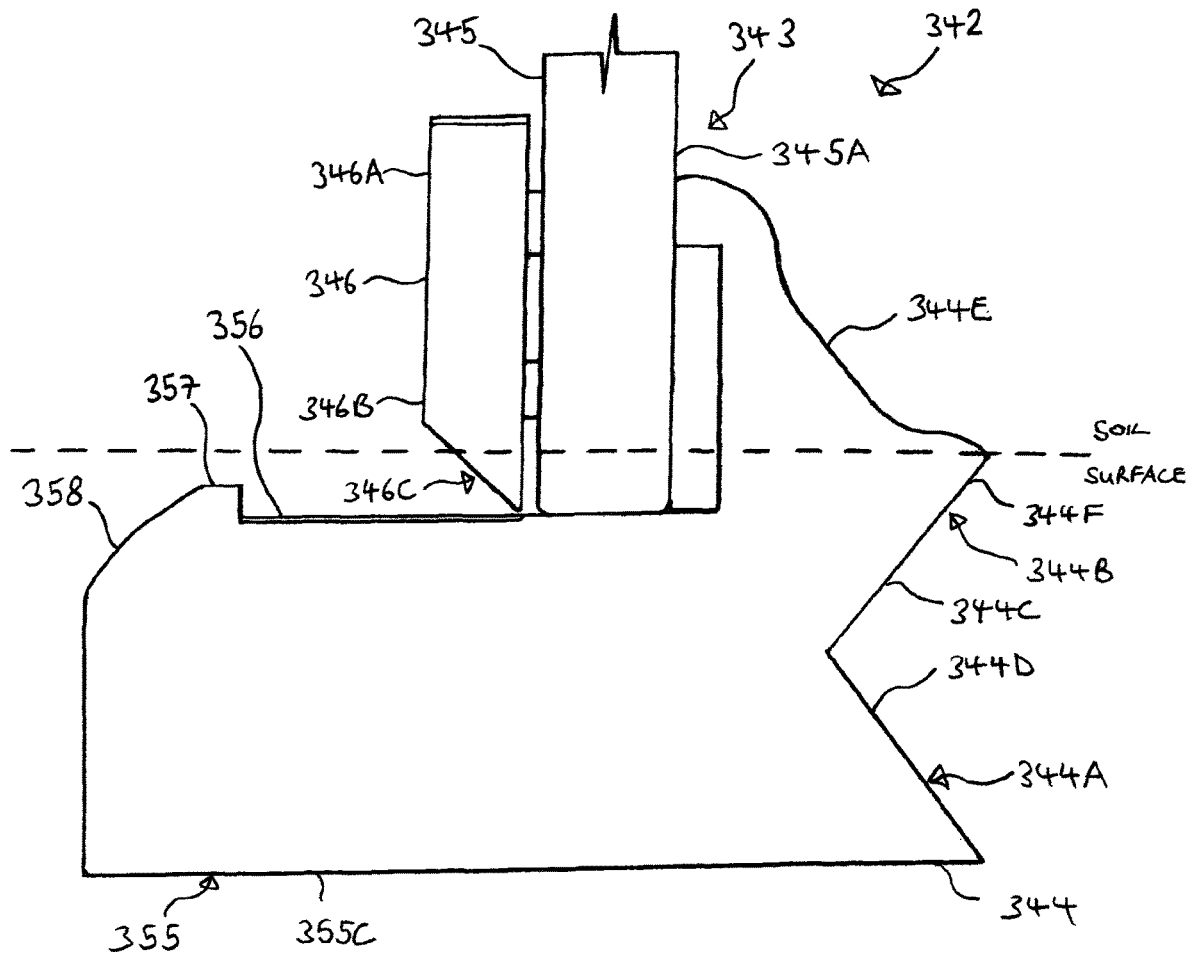
FIG. 9A is a schematic side view of yet a further alternative seeding unit for use in the seed drill device of FIG. 1.
Figure 9D:
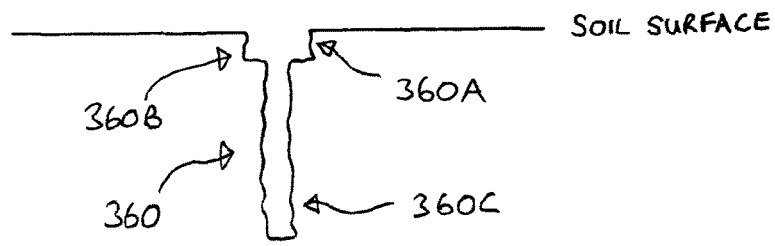
FIG. 9D is a schematic view of trenches formed by the seeding unit of FIG. 9A.
Figure 9C:
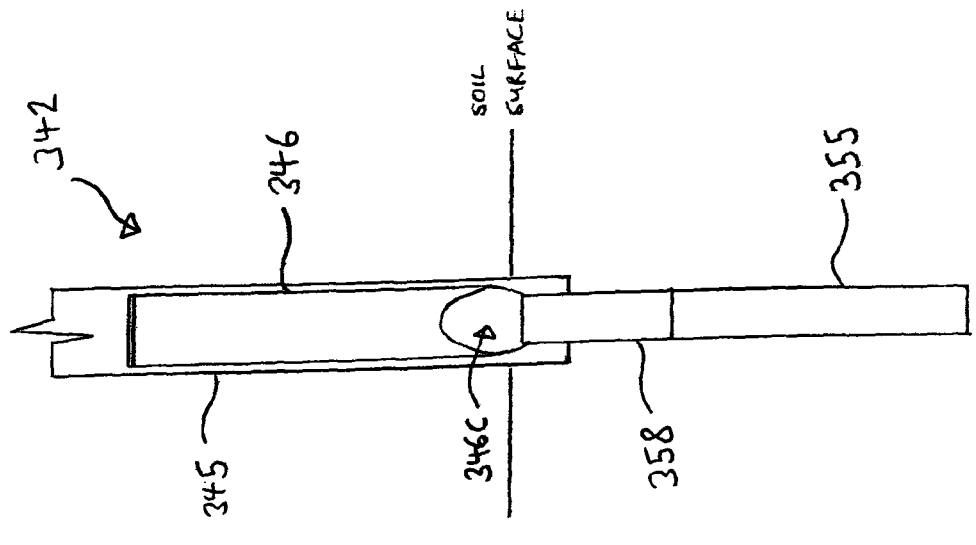
FIG. 9C is a schematic rear view of the seeding unit of FIG. 9A.
Figure 9B:
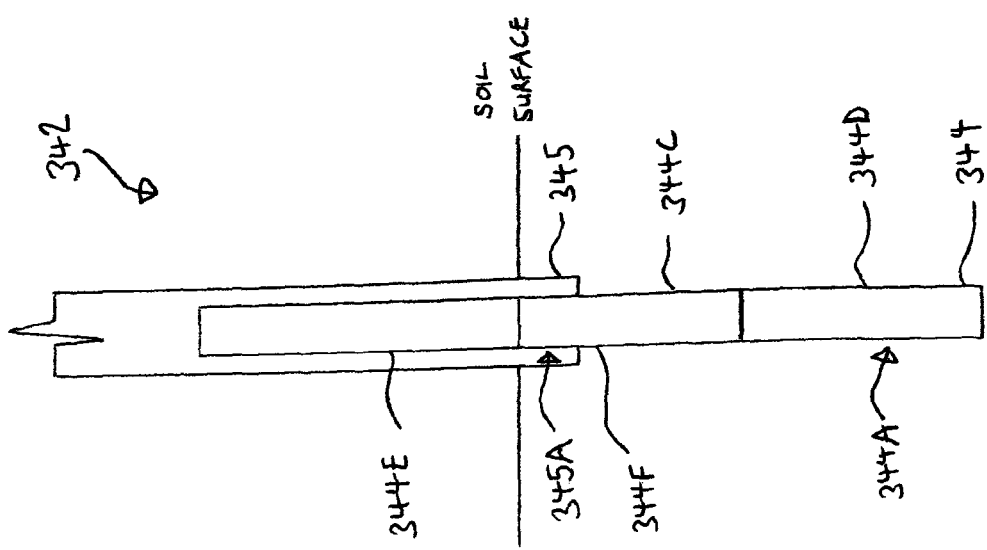
FIG. 9B is a schematic front view of the seeding unit of FIG. 9A.

FIGS. 9A-9C show a yet further alternative seeding unit 342 in accordance with one embodiment of the present disclosure for use in seed drill device 10.

Seeding unit 342 comprises a soil opening tine arrangement 343 that includes a rearwardly extended soil opening blade 344 mounted via bolts (not shown) to the front of a blade support tine 345. Rearwardly extended soil opening blade 344 comprises a front blade portion 344A defining a leading forward facing bevelled soil engagement surface 344B and an integrally formed trailing slot engagement plate 355. Blade support tine 345 defines a trailing forward facing soil engagement surface 345A. An associated seed delivery outlet 346 is mounted on the rear of blade support tine 345.

Rearwardly extended soil opening blade 344 comprises an upper blade portion 344C and a lower blade portion 344D depending from upper blade portion 344C. In this embodiment, upper blade portion 344C is laterally aligned with blade support tine 345. As illustrated, front blade portion 344A has significant longitudinal length in order to provide longevity against wear.

As in previous embodiments, soil opening blade 344 is typically formed by a 12 mm stainless steel cutting blade (e.g., tungsten FEROBIDE™ steel). Upper blade portion 344C includes an above ground blade portion 344E and a below ground blade portion 344F. Below ground blade portion 344F and lower blade portion 244C are each tapered such that the longitudinal depth of each portion increases with increased distance from the point where the two portions meet. In this way, leading forward facing soil engagement surface 344B of rearwardly extended soil opening blade 344 has a centrally recessed below ground profile (e.g., concave blade profile) with the (downward facing) upper blade portion 344C operative to sweep weed seed downwards and the (upward facing) lower blade portion 244C operative to assist ground penetration. As with previously described embodiment, the part of the blade above ground level acts to lift any surface trash up and around front blade portion 344A.

Seed delivery outlet 346 comprises an upper tubular body section 346A for connection to a seed delivery hose and a compressed lower body section 346B defining an inclined exit aperture 346C for releasing seed. Typically seed delivery outlet 346 has a width when viewed in the direction of travel that is less than a corresponding with of blade support tine 345 so that seed delivery outlet 346 is concealed from view when seeding unit 342 is viewed from the front.

As shown in FIG. 9D, seeding unit 342 is configured to form a seeded trench 360 comprising an upper trench portion 360A, an upper seed collection slot 360B and a lower and narrower central deep rooting slot 360C. Rearwardly extended soil opening blade 344 defines an elongate slot engagement plate 355, having a leading end 355A provided in advance of exit aperture 346C, trailing end 355B, and trailing exit aperture 346C.

As illustrated, slot engagement plate 355 has the same lateral width as front blade portion 344A is configured to travel behind front blade portion 344A inside the deep rooting slot 360C formed by the part of front blade portion 344A extending below blade support tine 345. Slot engagement plate 355 includes a substantially flat base 355C extending in parallel to the soil surface, a bevelled upper seed collection edge 356 (in this example positioned around 35 mm below ground level) operative to discourage seeds from bouncing upwards upon striking the slot engagement plate 355, and an upper rear projection 356 provided immediately after bevelled upper seed collection edge 356 and operative to divert seed towards the side walls of the upper seed collection slot 260B. As illustrated, upper rear projection 356 includes a sloped rear profile 358 configured to allow seeds to drop off gently into the soil as the slot engagement plate 355 moves past the seed location.

In this way, slot engagement plate 355 travels along with the seed delivery outlet 346 with a significant portion of the slot engagement plate 355 being located under and rearward of exit aperture 346C to prevent seed falling into the deep rooting slot 360C. The action of slot engagement plate 355 moving through the upper seed collection slot 260B causes the collected seed to be mixed with the soil at the seeding slot level so that the seed does not fall into the deep rooting slot 360C after the slot engaging member 355 has moved past the seed location.

Figure 10A:
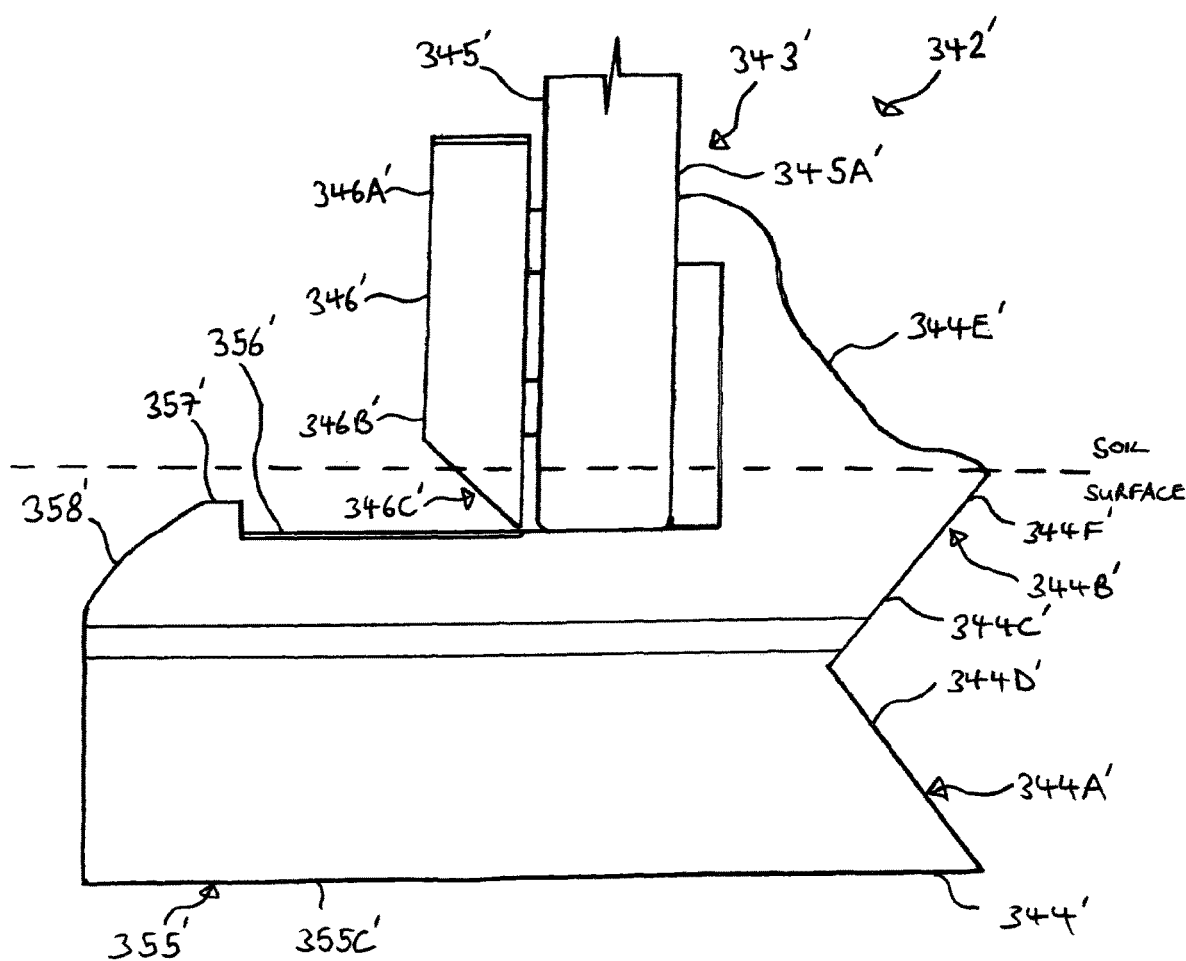
FIG. 10A is a schematic side view of yet a further alternative seeding unit for use in the seed drill device of FIG. 1.
Figure 10C:
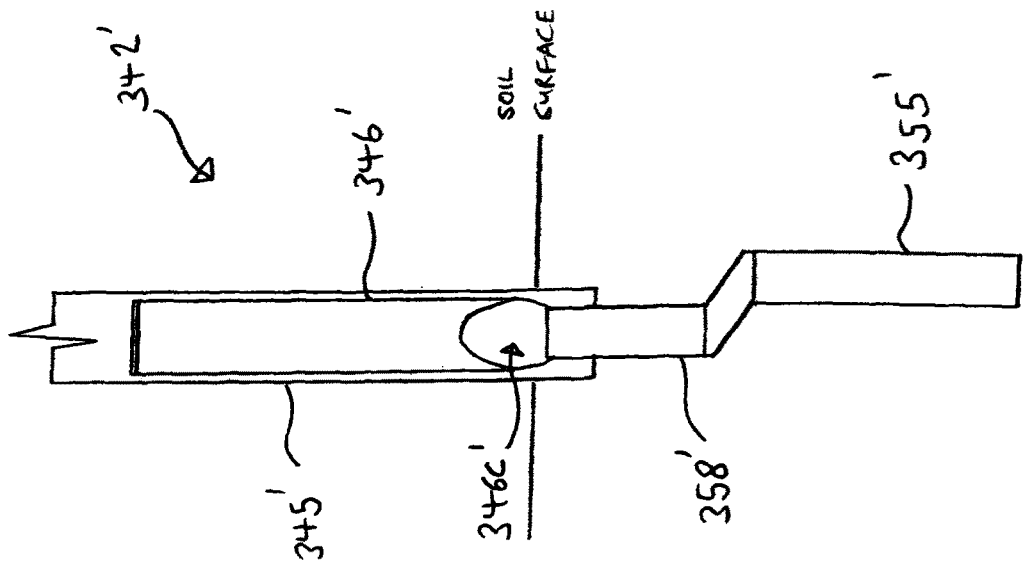
FIG. 10C is a schematic rear view of the seeding unit of FIG. 10A.
Figure 10B:
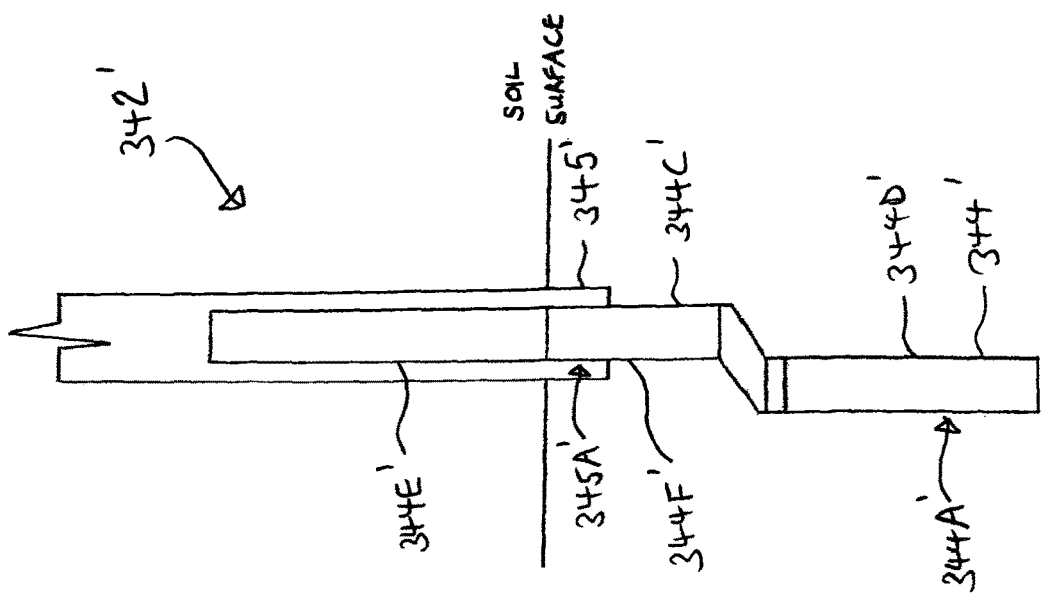
FIG. 10B is a schematic front view of the seeding unit of FIG. 10A.

FIGS. 10A-10C show a further alternative seeding unit 342' for use in seed drill device 10 based on the seeding unit 342 (features in common are labelled accordingly). Seeding unit 342' differs from seeding unit 342 in that rearwardly extended soil opening blade 344' comprises a lower blade portion 344D' that is laterally offset relative to upper blade portion 344C' and blade support tine 345'. In this way, seed is further discouraged from falling into the deep rooting slot 360C after the slot engaging member 355' has moved past the seed location.

Figure 11A:
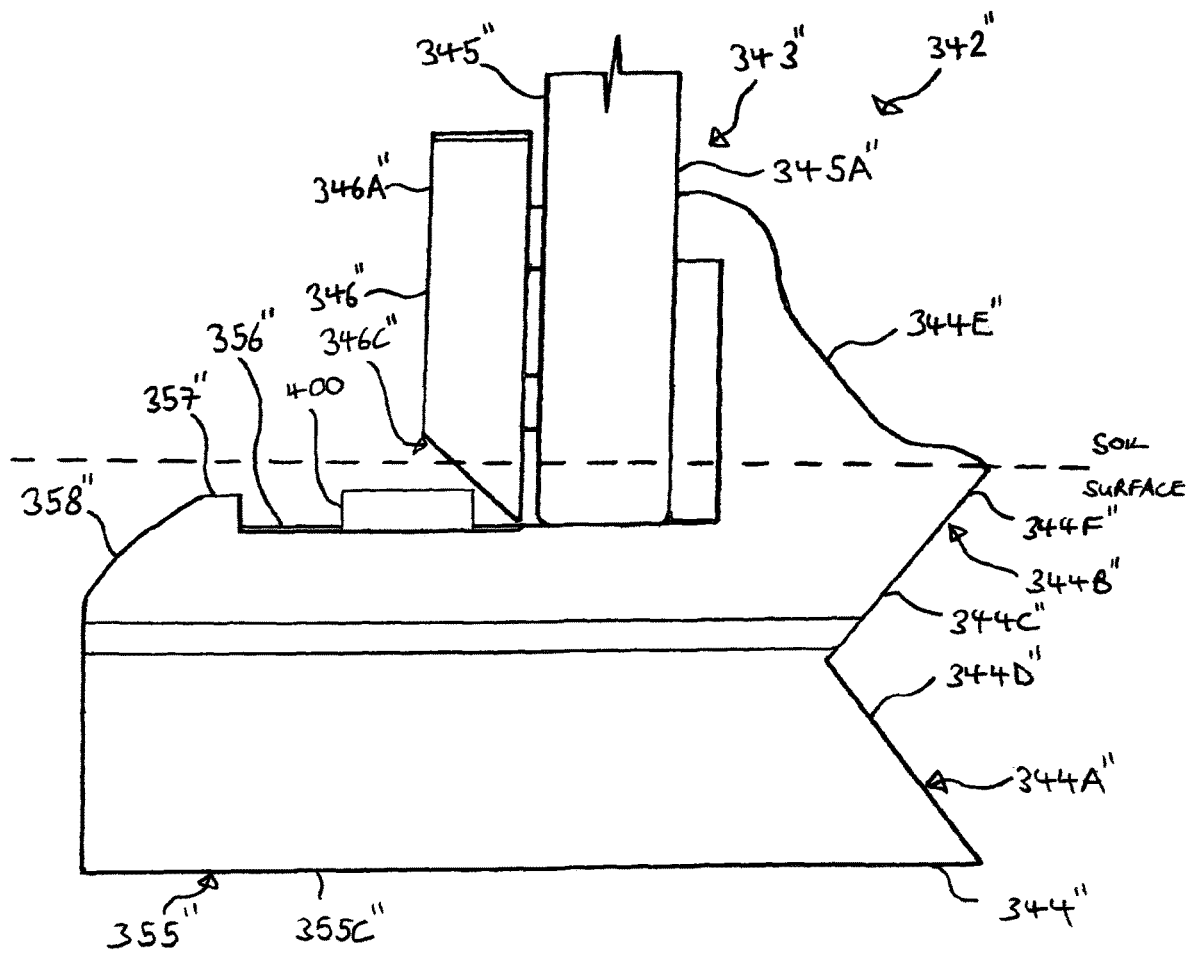
FIG. 11A is a schematic side view of yet a further alternative seeding unit for use in the seed drill device of FIG. 1.
Figure 11C:
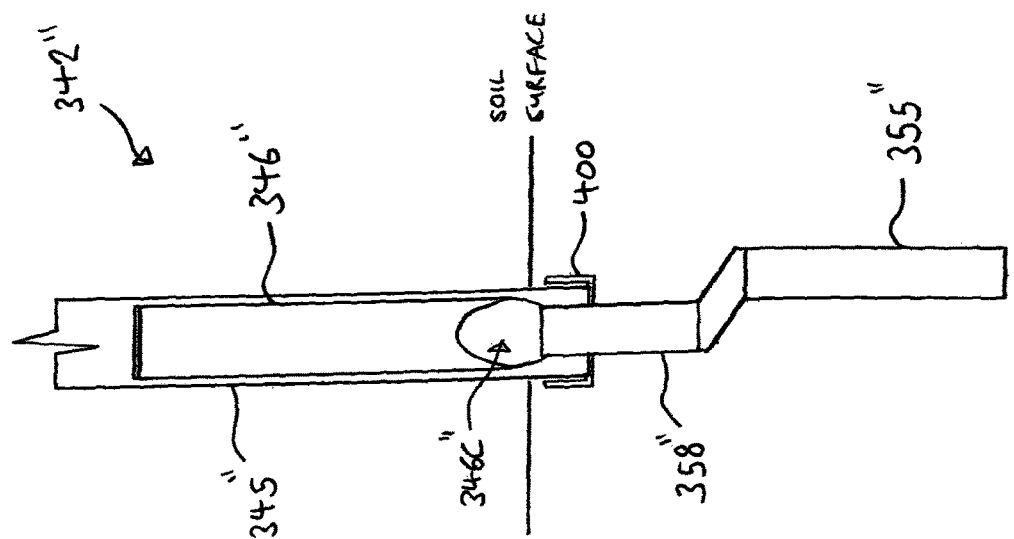
FIG. 11C is a schematic rear view of the seeding unit of FIG. 11A.
Figure 11B:
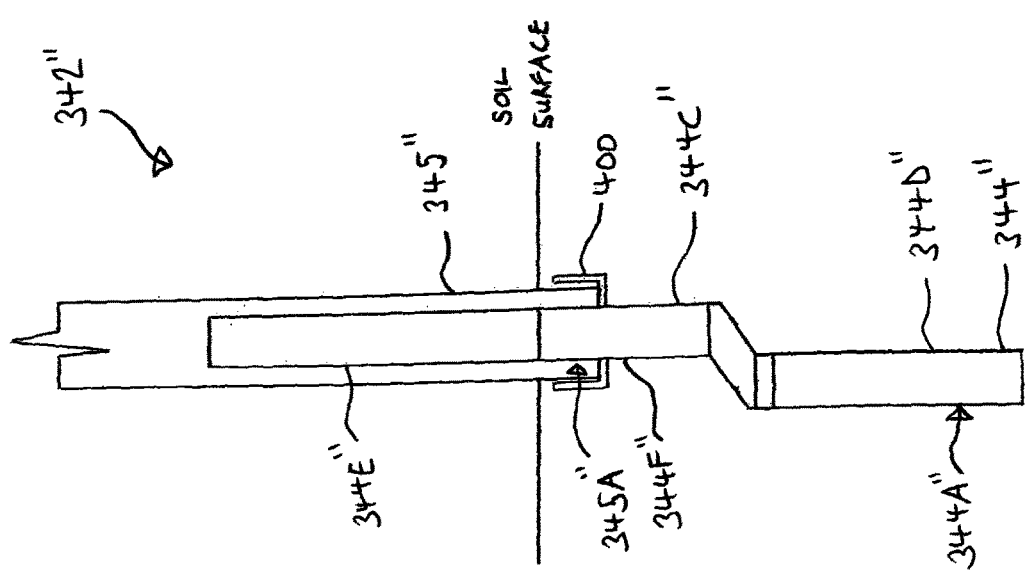
FIG. 11B is a schematic front view of the seeding unit of FIG. 11A.

FIGS. 11A-11C show a further alternative seeding unit 342" for use in seed drill device 10 based on the seeding unit 342' (features in common are labelled accordingly). Seeding unit 342" differs from seeding unit 342' in that the unit further comprises a pair of soil disruption wings 400 mounted on opposed lateral sides of the upper bevelled surface and operative to cut soil out of opposed walls of upper seed collection slot 360B to mix with the seed collected in the upper seed collection slot 360B in order to further discourage seed from falling into the deep rooting slot 360C after the slot engagement plate 355" has moved past the seed location.

Figure 12A:
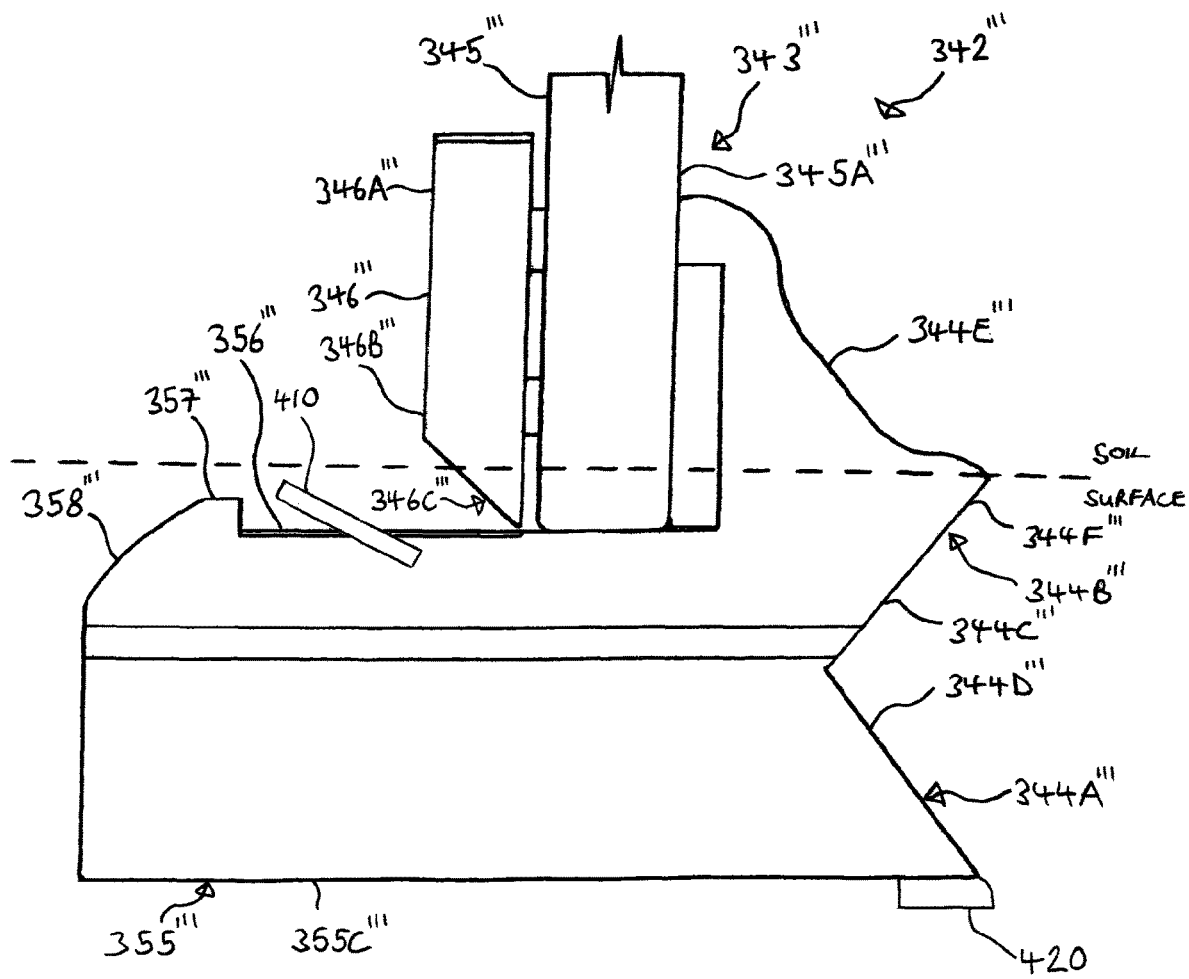
FIG. 12A is a schematic side view of yet a further alternative seeding unit for use in the seed drill device of FIG. 1.

FIGS. 12A-12C show a further alternative seeding unit 342' for use in seed drill device 10 based on the seeding unit 342' (features in common are labelled accordingly). Seeding unit 342' differs from seeding unit 342' in that the unit further comprises an inclined soil disruption sweeper bar 410 and a lower front projection 420. Inclined soil disruption sweeper bar 410 spans the full lateral width of blade support tine 345 and is operative to sweep soil from opposed walls of the upper seed collection slot 360B and mix the soil with seed collected in the upper seed collection slot 360B in order to further discourage seed from falling into the deep rooting slot 360C once the slot engagement plate 355' has moved past the seed location. Lower front projection 420 is configured to reduce the risk of the bottom edge sliding out of the ground (e.g., when the seeding unit is operating on an incline).

Figure 13:
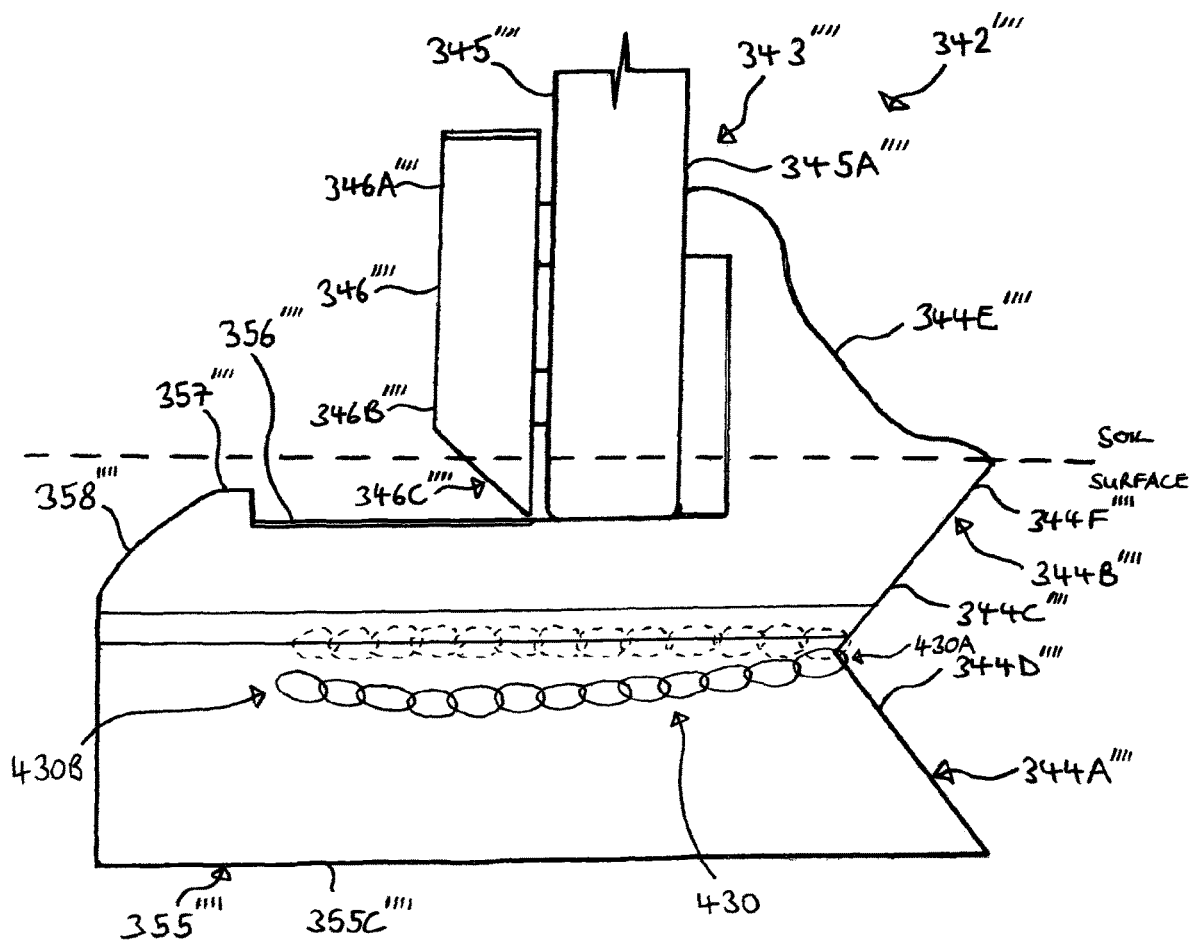
FIG. 13 is a schematic side view of yet a further alternative seeding unit for use in the seed drill device of FIG. 1.

FIG. 13 shows a yet further alternative seeding unit 342" " for use in seed drill device 10 based on the seeding unit 342' (features in common are labelled accordingly). Seeding unit 342" " differs from seeding unit 342' in that the unit further comprises a pair of elongate compliant soil disruption members 430 (in this example in the form of a compliant chains around 30 cm long) mounted on opposed lateral sides of rearwardly extended soil opening blade 344" ". Each elongate compliant soil disruption member 430 has a leading end 430A fixedly mounted to the soil engagement surface 344B" " of rearwardly extended soil opening blade 344" " and trailing end 430B that is free to follow the path taken by leading end 430A and trailing exit aperture 346C. Although a chain is illustrated, the compliant soil disruption members 430 may be formed by any suitable compliant member (e.g., a heavy cable or rope).

The invention claimed is:

1. A seeding unit comprising:
   a support;
   a soil opening member mounted to the support; and
   a seed delivery outlet, defining an exit aperture for releasing seed;
   wherein the soil opening member comprises:
   an upper part operative to form a seed collection slot in the ground; and
   a lower part laterally offset from the upper part and operative to form a rooting slot in the ground that is offset laterally from the seed collection slot;
   wherein:
   the seed collection slot and the rooting slot together form a slot and the seeding unit further comprises an elongate longitudinally extending slot engagement member operative to travel inside the slot beneath the seed delivery outlet and to cover an entrance to the rooting slot;

the slot engagement member is operative to travel inside the rooting slot and defines an upper edge operative to collect falling seed; and the slot engagement member comprises an elongate plate extending longitudinally from a position in advance of the seed delivery outlet to a position trailing the seed delivery outlet, the elongate plate being configured to travel inside the rooting slot behind the lower part of the soil opening member.

2. The seeding unit of claim 1, wherein the upper part of the soil opening member is substantially laterally aligned with the exit aperture of the seed delivery outlet.

3. The seeding unit of claim 1, wherein the soil opening member comprises a blade supported by a soil engaging tine.

4. The seeding unit of claim 3, wherein the upper part is an upper blade part and the lower part is a lower blade part.

5. The seeding unit of claim 4, wherein the blade defines a leading forward facing soil engagement surface and the soil engaging tine defines a trailing forward facing soil engagement surface.

6. The seeding unit of claim 5, wherein the blade is positioned at least substantially in advance of the soil engaging tine.

7. The seeding unit of claim 4, wherein the upper blade part projects downwardly beyond a lower edge of the soil engaging tine.

8. The seeding unit of claim 4, wherein the lower blade part is connected to the upper blade part by a laterally extending blade portion.

9. The seeding unit of claim 1, wherein the seeding unit further comprises a seed deflector configured to deflect seed exiting the seed delivery outlet towards the seed collection slot formed by the upper part of the soil opening member.

10. The seeding unit of claim 9, wherein the seed deflector defines a longitudinally extending deflection surface extending at least substantially along a full longitudinal length of the seed delivery outlet.

11. The seeding unit of claim 10, wherein the elongate longitudinally extending deflection surface is inclined to direct seed bound for the rooting slot towards the seed collection slot.

12. The seeding unit of claim 1, wherein upper and lower portions of a soil engaging surface are longitudinally recessed relative to a central portion of the soil engaging surface.

13. The seeding unit of claim 1, wherein upper and lower portions of the upper soil engaging surface are longitudinally recessed relative to a central portion of the upper soil engaging surface.

14. The seeding unit of claim 1, wherein an upper portion of the lower soil engaging surface is recessed relative to a lower portion of the lower soil engaging surface.

15. The seeding unit of claim 1, wherein the elongate plate extends longitudinally from the lower part of the soil opening member.

16. The seeding unit of claim 15, wherein the elongate plate is integrally formed with the lower part of the soil opening member.

17. The seeding unit of claim 1, wherein the upper edge of the slot engagement member further comprises a soil disrupter operative to disrupt side walls of the seed collection slot.

18. The seeding unit of claim 1, wherein the slot engagement member extends at least substantially along a full longitudinal length of the seed delivery outlet to a point rearward of the seed delivery outlet.

19. A seed sowing apparatus comprising:

a frame defining a leading part supporting a soil opening stage and a trailing part supporting a soil closing stage trailing the soil opening stage, wherein the soil opening stage comprises a plurality of laterally spaced seeding units each as defined in claim 1, wherein each seeding unit is configured to form a respective seeded trench in the ground when the apparatus is in use driven through soil in a forward direction of travel;

wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

20. A method of sowing seed, comprising:

providing a seed sowing apparatus according to claim 19; and using the seed sowing apparatus to:

form a plurality of seeded trench sections in soil; and subsequently form adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

21. A method of sowing seed, comprising:

providing seed sowing apparatus comprising a plurality of seeding units as defined in claim 1; and forming a plurality of seeded trench sections in soil.

22. A seeding unit comprising:

a support;

a soil opening member mounted to the support and operative to form a slot in the ground; and a seed delivery outlet, defining an exit aperture for releasing seed;

wherein the soil opening member comprises:

an upper part operative to form a seed collection slot in the ground; and a lower part operative to form a rooting slot in the ground;

wherein the seeding unit further comprises an elongate longitudinally extending slot engagement member operative to travel inside the slot beneath the seed delivery outlet and to cover an entrance to the rooting slot, and wherein the slot engagement member is a compliant member having a leading end coupled to the seeding unit and a trailing end that is free to follow the path of the leading end.

23. The seeding unit of claim 22, wherein the compliant member is operative to travel inside the seed collection slot.

24. The seeding unit of claim 22, wherein the trailing end is configured to drop into the seed collection slot and travel along the entrance to the rooting slot.

25. The seeding unit of claim 22, wherein the compliant member is selected from the group of: a chain; a cable; and a rope.

26. The seeding unit of claim 22, wherein the compliant member is operative to travel inside the rooting slot.

27. The seeding unit of claim 26, wherein the compliant member defines an upper edge operative to collect falling seed.

28. A seed sowing apparatus comprising:
a frame defining a leading part supporting a soil opening stage and a trailing part supporting a soil closing stage trailing the soil opening stage, wherein the soil opening stage comprises a plurality of laterally spaced seeding units each as defined in claim 22, wherein each seeding unit is configured to form a respective seeded trench in the ground when the apparatus is in use driven through soil in a forward direction of travel;
wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

29. A method of sowing seed, comprising:
providing seed sowing apparatus as defined in claim 28; and
using the seed sowing apparatus to:
form a plurality of seeded trench sections in soil; and
subsequently form adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

30. A method of sowing seed, comprising:
providing seed sowing apparatus comprising a plurality of seeding units as defined in claim 22; and
forming a plurality of seeded trench sections in soil.

31. A seed sowing apparatus comprising:
a frame defining a leading part supporting a soil opening stage and a trailing part supporting a soil closing stage trailing the soil opening stage, wherein the soil opening stage comprises a plurality of laterally spaced seeding units each as defined in claim 22, wherein each seeding unit is configured to form a respective seeded trench in the ground when the apparatus is in use driven through soil in a forward direction of travel;
wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

32. A method of sowing seed, comprising
providing seed sowing apparatus comprising a plurality of seeding units as defined in claim 22; and
forming a plurality of seeded trench sections in soil.

33. A method of sowing seed, comprising:
providing a seed sowing apparatus according to claim 32; and using the seed sowing apparatus to:
form a plurality of seeded trench sections in soil; and
subsequently form adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

34. A seeding unit comprising:
a support;
a soil opening member mounted to the support and operative to form a slot in the ground; and
a seed delivery outlet, defining an exit aperture for releasing seed;
wherein the soil opening member comprises:
an upper part operative to form a seed collection slot in the ground; and
a lower part operative to form a rooting slot in the ground; and
the seeding unit further comprises an elongate longitudinally extending slot engagement member operative to travel inside the slot beneath the seed delivery outlet and to cover an entrance to the rooting slot;
wherein the slot engagement member comprises an elongate plate extending longitudinally from a position in advance of the seed delivery outlet to a position trailing the seed delivery outlet, the elongate plate being configured to travel inside the rooting slot behind the lower part of the soil opening member and defining an upper edge operative to collect falling seed;
wherein the upper edge of the slot engagement member is configured to mix collected seed with the soil as the slot engagement member moves through the soil to prevent the collected seed dropping into the rooting slot once the slot engagement member has advanced beyond the location of the seed.

35. A seeding unit according to claim 34, wherein the upper edge of the slot engagement member is at least substantially level with an entrance to the rooting slot.

36. A seeding unit according to claim 34, wherein the upper edge of the slot engagement member comprises a bevelled edge operative to discourage seeds from bouncing upwards upon striking the slot engagement member.

37. A seeding unit according to claim 36, wherein the upper edge of the slot engagement member includes a raised rear projection operative to divert seed toward side walls of the seed collection slot.

38. A seeding unit according to claim 37, wherein the raised rear projection is located immediately trailing the bevelled edge.

39. A seeding unit according to claim 34, wherein the elongate plate extends longitudinally from the lower part of the soil opening member.

40. A seeding unit according to claim 39, wherein the elongate plate is integrally formed with the lower part of the soil opening member.

41. A seeding unit according to claim 34, wherein the upper edge of the slot engagement member further comprises a soil disrupter operative to disrupt side walls of the seed collection slot.

42. A seeding unit according to claim 34, wherein the slot engagement member extends at least substantially along a full longitudinal length of the seed delivery outlet to a point rearward of the seed delivery outlet.

43. A seed sowing apparatus comprising:
a frame defining a leading part supporting a soil opening stage and a trailing part supporting a soil closing stage trailing the soil opening stage, wherein the soil opening stage comprises a plurality of laterally spaced seeding units each as defined in claim 34, wherein each seeding unit is configured to form a respective seeded trench in the ground when the apparatus is in use driven through soil in a forward direction of travel;
wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

44. A method of sowing seed, comprising:

providing seed sowing apparatus comprising a plurality of seeding units as defined in claim 34; and forming a plurality of seeded trench sections in soil.

45. A method of sowing seed, comprising:

providing a seed sowing apparatus according to claim 44; and using the seed sowing apparatus to:

form a plurality of seeded trench sections in soil; and subsequently form adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

46. A seeding unit comprising:

a support;

a soil opening member mounted to the support; and a seed delivery outlet, defining an exit aperture for releasing seed;

wherein the soil opening member comprises:

an upper part operative to form a seed collection slot in the ground; and a lower part operative to form a rooting slot in the ground;

wherein the soil opening member comprises a blade supported by a soil engaging tine and defining a soil engaging surface, wherein the upper part comprises an at least substantially upright upper blade part and the lower part comprising an at least substantially upright lower blade part, the lower blade part being laterally offset from the upper blade part and operative to form a rooting slot that is offset laterally from the seed collection slot.

47. A seed sowing apparatus comprising:

a frame defining a leading part supporting a soil opening stage and a trailing part supporting a soil closing stage trailing the soil opening stage, wherein the soil opening stage comprises a plurality of laterally spaced seeding units each as defined in claim 46, wherein each seeding unit is configured to form a respective seeded trench in the ground when the apparatus is in use driven through soil in a forward direction of travel;

wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

48. A method of sowing seed, comprising:

providing seed sowing apparatus comprising a plurality of seeding units as defined in claim 46; and forming a plurality of seeded trench sections in soil.

49. A method of sowing seed, comprising:

providing a seed sowing apparatus according to claim 48; and using the seed sowing apparatus to:

form a plurality of seeded trench sections in soil; and subsequently form adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

\* \* \* \* \*